(12) United States Patent
Shin

(10) Patent No.: US 7,444,357 B2
(45) Date of Patent: *Oct. 28, 2008

(54) METHOD AND APPARATUS FOR SEARCHING AN INDEX STRUCTURE FOR TV-ANYTIME FORUM METADATA HAVING LOCATION INFORMATION FOR DEFINING A MULTI-KEY

(75) Inventor: Hyoseop Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 309 days.

This patent is subject to a terminal disclaimer.

(21) Appl. No.: 10/845,211

(22) Filed: May 14, 2004

(65) Prior Publication Data

US 2004/0210571 A1 Oct. 21, 2004

Related U.S. Application Data

(63) Continuation of application No. 10/623,658, filed on Jul. 22, 2003, now Pat. No. 7,343,381.

(30) Foreign Application Priority Data

Jul. 23, 2002 (KR) ............... 10-2002-0043097
Oct. 15, 2002 (KR) ............... 10-2002-0062923

(51) Int. Cl.
*G06F 7/00* (2006.01)
*G06F 17/00* (2006.01)
(52) U.S. Cl. ............... 707/104.1; 707/100; 707/3
(58) Field of Classification Search ............... 707/102, 707/103 R, 100, 104.1
See application file for complete search history.

(56) References Cited

U.S. PATENT DOCUMENTS

| 5,655,117 | A | * | 8/1997 | Goldberg et al. ............ 707/102 |
| 6,263,313 | B1 | | 7/2001 | Milsted et al. |
| 6,496,830 | B1 | * | 12/2002 | Jenkins, Jr. ............... 707/100 |
| 6,804,677 | B2 | * | 10/2004 | Shadmon et al. ............ 707/101 |
| 6,823,329 | B2 | * | 11/2004 | Kirk et al. ............... 707/2 |
| 2002/0123928 | A1 | * | 9/2002 | Eldering et al. ............ 705/14 |
| 2002/0174147 | A1 | * | 11/2002 | Wang et al. ............... 707/513 |
| 2002/0184195 | A1 | * | 12/2002 | Qian ............... 707/3 |

FOREIGN PATENT DOCUMENTS

JP 2001-229060 A 8/2001

OTHER PUBLICATIONS

Hubbard, John R. Programming with C++, Second Edition. © 1996, 2000. p. 219.*

(Continued)

*Primary Examiner*—Apu Mofiz
*Assistant Examiner*—Charles E Lu
(74) *Attorney, Agent, or Firm*—Sughrue Mion, PLLC

(57) ABSTRACT

An index structure of metadata provided for searching for information on contents and a method for providing indices of the metadata, and a method and an apparatus for searching for the metadata using the index structure of the metadata are provided, in which the index structure of the metadata includes values of multi-keys and identification information of the metadata corresponding to the values of the multi-keys, wherein the multi-keys are structured by a combination of predetermined fields of the metadata.

26 Claims, 15 Drawing Sheets

OTHER PUBLICATIONS

Pershikov, V. I., et al. "Tolkovy Slovar po Informatike" (The Explanatory Dictionary of Informatics), Moscow, Finances and Statistics Publishing House, 1998, p. 188, right column.

The TV-Anytime Forum; Specification Series: S-3 On: Metadata (Normative) Part B: System Aspects in a Unidirectional Environment; Document: SP003v1.2 Part B Provisional Specification Date: Apr. 5, 2002.

SP003V1.3 Part B_System issues.

H.V. Jagadish, et al.; "On Effective Multi-Dimensional Indexing For Strings"; ACM Sigmod 2000; May 2000, pp. 403-414; Dallas, TX.

Brian Cooper, et al.; "A Fast Index For Semistructured Data"; Proceedings of the 27th VLDB Conference, 2001; Roma, Italy.

Torsten Grust; "Accelerating XPath Location Steps"; ACM Sigmod 2002; Jun. 4-6, 2002; pp. 109-120; Madison, Wisconsin.

Christian Bohm, et al.; "Multidimensional Index Structures in Relational Databases"; Journal of Intelligent Information Systems; 2000; pp. 51-70; 15; Kluwer Academic Publishers; The Netherlands.

Office Action dated Mar. 21, 2008, with a mail date of Apr. 1, 2008, in Japanese Patent Application No. 2005-025703.

\* cited by examiner

FIG. 1  Related Art

FIG. 5  Related Art
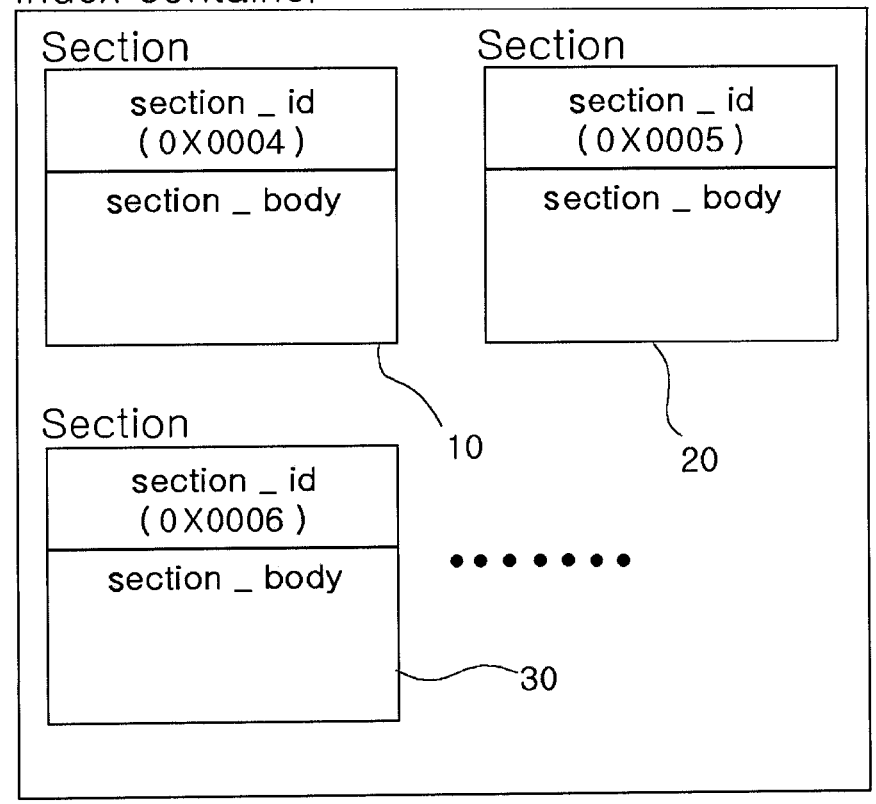
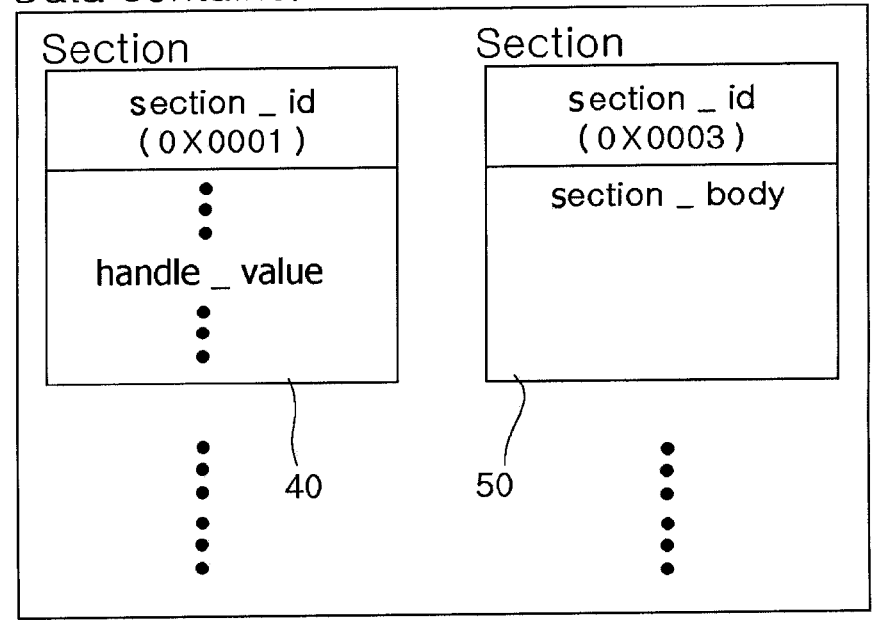

FIG. 7a Related Art
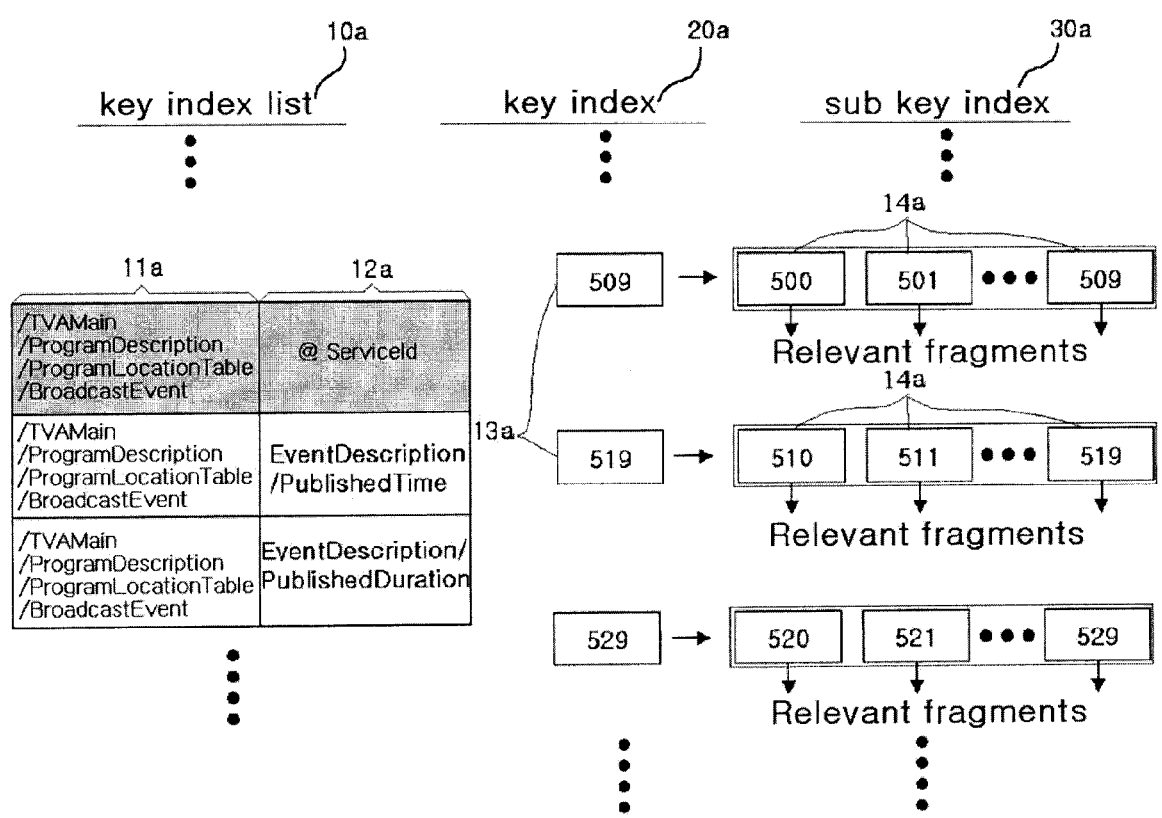

METHOD AND APPARATUS FOR SEARCHING AN INDEX STRUCTURE FOR TV-ANYTIME FORUM METADATA HAVING LOCATION INFORMATION FOR DEFINING A MULTI-KEY

CROSS-REFERENCE TO RELATED APPLICATIONS

This is a continuation of U.S. patent application Ser. No. 10/623,658 filed Jul. 22, 2003 now U.S. Pat. No. 7,343,381, the disclosure of which is incorporated herein by reference. The present application is based on Korean Patent Application Nos. 2002-43097 and 2002-62923, which are incorporated herein by reference.

BACKGROUND OF THE INVENTION

1. Field of the Invention

The present invention relates to an index structure of metadata provided for searching for information on contents and a method for providing indices of the metadata, and a method and an apparatus for searching for the metadata using the index structure of the metadata. More particularly, the present invention relates to an index structure of metadata provided for searching for information on contents and a method for providing indices of the metadata, and a method and an apparatus for searching for the metadata using the indices of metadata, the metadata containing multi-keys with which information on contents can be more efficiently searched when XML metadata on digital contents defined by TV-Anytime Forum (hereinafter referred to as "TVA metadata") is divided into fragments as an independent unit and transmitted on a fragment basis.

2. Description of the Related Art

The TV-Anytime Forum is a private standardization organization established in September 1999 with the purpose of developing standards for providing audiovisual related services in a user-friendly environment such as a personal digital recorder (PDR) having a high volume personal storage device. Specifically, the aim of the services is to enable all the users to view and listen to various types of programs (such as conventional broadcasting services, online interactive services and the like) at a desired time and in a desired manner based on the personal storage device.

The TV-Anytime Forum has operated Working Groups for business models, system/transmission interfaces/contents referencing, descriptions, metadata, rights management and protection and the like, in order to establish standardization. With respect to the metadata concerned in the present invention, "1st Draft of Metadata Specification SP003v1.3" up to June 2002 has been published.

A configuration of the PDR will be briefly described with reference to FIG. 1. The PDR 100 receives video/audio signals and metadata via a variety of networks such as sky waves, satellite waves, internet networks and the like from a provider 200 for providing video/audio signals, collects viewing and listening patterns, and personal tastes of users, if necessary, and transmits them to the provider 200 for providing the video/audio signals. The PDR 100 comprises a high volume storage device for storing therein the received video/audio signals and metadata. The PDR 100 further comprises software for storage and reproduction of the video/audio signals, and an electronic program guide (EPG) application for retrieving and displaying metadata for the video/audio signals. The user ascertains the metadata for the video/audio data, i.e., titles of the programs, program reproduction times and the like, through a grid guide screen of the EPG application shown in FIG. 2, selects a desired program, and receives it via the network in real time or reproduces the video/audio data previously stored in the high volume storage device.

The metadata refer to data describing contents such as titles and synopses of programs, and are defined as "data about data." In the TVA metadata specifications of the TV-Anytime Forum, its structure is defined by use of XML schema language (see XML 1.0 of W3C), the standard by the W3C (a consortium for promoting standards for the XML), and the semantics and attributes of the respective metadata elements are also defined. The TVA metadata relevant to broadcasting contents are configured with an XML document having a root node, "TVAMain (300)" as shown in FIG. 3. The TVA metadata relevant to programs are configured with, for example, nodes such as ProgramInformation Table, GroupInformation Table, ProgramLocation Table, ServiceInformation Table and the like, under the node of "ProgramDescription."

In the TV-Anytime Forum, the TVA metadata are transmitted on a fragment basis as an independent unit in order to transmit a large volume of TVA metadata in a stream format. The concept of fragments will be briefly described with reference to FIG. 4. The fragments are obtained by dividing the TVA metadata configured with the XML documents shown in FIG. 3 into predetermined tree structures. For example, where the entire TVA metadata are divided into a tree structure (fragment TVAMain) including an upper node of "TVAMain" and predetermined child nodes under this upper node, a tree structure (fragment ProgramInformation) including an upper node of ProgramInformation Table and child nodes under this upper node, a tree structure (fragment BroadcastEvent) including an upper node of the BroadcastEvent Information and child nodes under this upper node, each of the divided tree structures becomes a fragment. The fragments can be transmitted independently of the other fragments, and the fragments can be accessed individually.

For individual access to the fragments, it is necessary to know a node referenced by a transmitted TVA metadata fragment, i.e., a node corresponding to the upper node of the TVA metadata fragment, in the entire metadata tree structure, and to describe relative paths in the TVA metadata fragments of keys contained in the transmitted TVA metadata fragment. To this end, XPath, which is a syntax for describing a path to one or more nodes in an XML document defined by W3C, is used. The term 'key' refers to a specific field of the metadata used for indexing, and also means child nodes of a node referenced by a fragment. Fields (for search conditions) input by the user, such as 'Service ID' and 'Published Time' correspond to the keys.

In order to provide efficient search for and access to fragments, an index structure for the keys included in the metadata fragments is additionally required, and information on the index structure, i.e., index information, is also transmitted independently of the metadata fragments.

Under the environment provided by the TV-Anytime Forum, if a user desires to retrieve information on a program meeting a predetermined Published Time condition, the index information transmitted thereto independently of the fragments is utilized to identify the location (identifier) of a metadata fragment meeting a desired Published Time condition and an access to the relevant metadata fragment is then made based on the location (identifier), so as to extract metadata meeting the Published Time condition.

TV-Anytime Specification TV145, J. P. Evain, "1st Draft of Metadata Specification SP003v1.3", TV-Anytime Forum 17th meeting, Montreal, Canada, June 2002; hereinafter, referred to as "Single key index art reference" proposes a single key index structure for a metadata fragment index.

Note that the term "single key" is used herein to distinguish it from a concept of the term "multi-key" in an embodiment of the present invention to be described later. A multi-key structure according to an embodiment of the present invention enables the user to access metadata for a plurality of keys, using a plurality of the keys simultaneously, but a single key index structure of the prior art allows only one single key to be used for an access to the metadata.

The notion of a container defined by the TV-Anytime Forum will be described prior to describing the index structure.

The TV-Anytime Forum defines a container as a top-level storage to which all the data covering the aforementioned index information and the metadata fragments are transmitted, which is called a type of top-level transmission. Describing the container briefly, each container comprises a plurality of sections, each storing therein the index information or the metadata fragments. The container can be classified into an index container and a data container according to the information carried thereby: the index container carries index information sections such as a key index list (key_index_list) section, a key index (key_index) section, a sub key index (sub_key_index) section, a string repository (string_repository) section and a fragment data repository (fragment_data_repository) section, whereas a data container carries metadata fragment sections such as an elements table (elements_table) section, a string repository (string_repository) section and a fragment data repository (fragment_data_repository) section. The above classification is done based on the contents of the information included in the containers. Both the index container and the data container are identical in configuration.

Referring to the container defined by the TV-Anytime Forum as illustrated in FIG. 5, the container comprises a container identifier (container_id) data field (not shown) and a large number of sections. In each section, the contents stored in 'section_body' are identified according to an encoded value in 'section_id'. For example, a section 10 of which the encoded value in 'section_id' is '0X0004' is identified as a key index list (key_index_list) section, a section 20 of which the encoded value in 'section_id' is '0X0005' is identified as a key index (key_index) section, a section 30 of which the encoded value in 'section id' is '0X0006' is identified as a sub key index (sub_key_index) section, a section 40 of which the encoded value in 'section id' is '0X0001' is identified as an element table (element_table) section, and a section 50 of which the encoded value in 'section id' is '0X0003' is identified as a fragment data repository (fragment_data_repository) section.

The TVA metadata fragments are stored in the fragment data repository (fragment_data_repository) section 50 of the data container and then transmitted. The identifier information (handle_value) for the TVA metadata fragments in the data container is included in the element table section 40 of the data container.

In conclusion, the TVA metadata fragment is uniquely identified by the container identifier information (container_id) and the metadata fragment identifier information (handle_value) of the container that includes the TVA metadata fragment.

The single key index art reference described above proposes the single key index structure for indexing the TVA metadata fragments stored in the aforementioned data container, i.e., a structure composed of the key index list (key_index_list) section 10, the key index (key_index) section 20, and the sub key index (sub_key_index) section 30. Since the syntax of the structure is described in detail in the single key index reference described above, the detailed description thereof will be omitted. Hereinafter, the structure will be described with reference to FIG. 6 that illustrates the structure by segments of the index information.

The key index list (key_index_list) section 10 defined in the single key index structure provides a list of all the single keys transmitted. The list includes single key information defining each single key and identification information on the key index (key_index) section 20 to be described later. The single key information comprises (1) location information of the metadata fragment relevant to the single key, and (2) location information of the single key within the metadata fragment. The location information of the metadata fragment is expressed in XPath (fragment_xpath_ptr) in the TVA. The location information of the single key is expressed in XPath (key_xpath_ptr) for the relative path within the relevant fragment of the node used as the single key in the TVA.

The XPath of the metadata fragment is a path to the root node of the TVA metadata XML document, i.e., an absolute path, and the XPath of the nodes used as the single keys, i.e., the XPath of the single keys, represents a relative path of the single key for the relevant metadata fragment. The XPath for the metadata fragment and the XPath for the single key are stored in a 'fragment_xpath_ptr' segment 11 and a 'key_xpath_ptr' segment 12, respectively.

Furthermore, the key index list (key_index_list) section 10 includes the identification information on the key index (key_index) section 20 of each single key to be described later (i.e., the container identifier information (container_id) of the container storing therein the key index (key_index) section 20 and the key index identifier information). The container identifier information and the key index identifier information are stored in an 'index_container' segment of the key index list (key_index_list) section 10 and a 'key index_identifier' segment, respectively, and then transmitted.

The key index (key_index) section 20 defined in the single key index structure provides a list of information representing the ranges of values of the key included in the respective sub key index (sub_key_index) sections 30, i.e., the highest value of the key among the values of the key within the respective range (hereinafter referred to as a 'representative key value'), and identification information on the sub key index (sub_key_index) section 30 relevant to each representative key value (i.e., the container identifier information (container_id) of the container storing therein the sub key index (sub_key_index) section, and the sub key index identifier information).

Accordingly, the key index section (key_index) 20 includes a 'key_index_identifier' segment for storing therein the key index identifier information defined in the key index list (key_index_list) section 10, 'high_key_value' segments 13 for storing therein the representative key values of the respective ranges of values of the key included in the sub key index (sub_key_index) section 30, and 'sub_index_container' segments and 'sub_index_identifier' segments for the identification information on the sub key index (sub_key_index) section 30 (i.e., for the container identifier information (container_id) of the container in which the sub key index (sub_key_index) section 30 is stored, and the respective sub key index identifier information). The sub key index (sub_key_index) section 30 defined in the single key index structure provides a list of the values of the key. The list further includes identification information on the metadata fragments corresponding to the values of the key (i.e., the container identifier information (container_id) of the containers storing the metadata fragments and the identifier information (handle_value) of the metadata fragments).

Accordingly, the sub key index (sub_key_index) section 30 includes a 'sub_index_identifier' segment for storing therein the sub key index identifier information defined in the key index (key_index) section 20, 'key_value' segments 14 for storing therein the respective ranges of values of the key, 'target_container' segments for storing therein the respective container identifier information (container_id) of the containers in which the metadata fragments are stored, and 'target_handle' segments for storing therein the respective fragment data identifier information (handle_value). The single key index structure may be more easily understood by referring to FIG. 7 illustrating the index information.

FIGS. 7a and 7b show the key index list (key_index_list) section including single keys relevant to the Service Id, the Published Time and the Published Duration. The upper node of the metadata fragment including the single keys relevant to the Service Id, the Published Time and the Published Duration is 'BroadcastEvent' 310 as shown in FIG. 3, identified by a shaded block. Accordingly, the XPath '/TVAMain/ProgramDescription/Progam-Location Table/BroadcastEvent' for the 'BroadcastEvent' fragment is stored in the 'fragment_xpath_ptr' segment 11a, and the XPaths to the single keys of the Service Id, the Published Time and the Published Duration for the 'BroadcastEvent' fragment, i.e., '@ServiceId' (311a in FIG. 3), 'EventDescription/PublishedTime' (311b in FIG. 3) and 'EventDescription/PublishedDuration' (311c in FIG. 3) are stored in the 'key_xpath_ptr' segment 12a.

Illustratively, FIG. 7a shows a key index (key_index) section 20a and a sub key index (sub_key_index) section 30a for the Service Id (XPath of the single key: @ServiceId) of the key index list (key_index_list) section 10a. FIG. 7b shows a key index (key_index) section 20b and a sub key index (sub_key_index) section 30b for the Published Time (XPath of the single key: EventDescription/PublishedTime).

This single key index structure is disadvantageous in that it is inefficient to perform a compound condition search, i.e., a search by one or more search conditions, since it can only support a single key search, i.e., an index search using a key corresponding to a specific field of the metadata fragment according to the TV-Anytime specification. For example, in order to display a list of broadcast programs on the grid guide screen as shown in FIG. 2, search operations for two fields, i.e., the Service Id and the Published Time, are required.

In order to explain the compound condition search using a conventional single key index structure, a case where a list of programs of which a Service Id is in the range of 507 to 514 and the Published Time for 09:30 to 10:00 will be explained hereinafter by way of example. In the TV-Anytime metadata specification, search conditions for retrieving metadata related to the program list are expressed as follows.

Fragment targeted for search (BroadcastEvent):
/TVAmain/ProgramDescription/ProgramLocationTable/BroadcastEvent,
List of search conditions:
507<=ServiceId<=514
09:30<=EventDescription/PublishedTime<=10:00.

In the conventional single key index structure, two methods are available for obtaining fragments meeting the designated search conditions. The methods will be described in detail with reference to FIGS. 8a and 8b.

(1) First Search Method Using the Single Key Index

In the first method, as shown in FIG. 8a, sets of fragments as intermediate results meeting respective conditions are independently searched by use of respective single keys for the ServiceId and the EventDescription/PublishedTime. Thereafter, fragments common in both sets of the independently searched fragments are obtained, among which a final resultant set of fragments meeting the conditions is obtained.

Hereinafter, this method will be described in detail with reference to FIGS. 7a and 8a.

First, single key information and the value of the single key required for each of the Service Id search and Published Time search is desgnated (S11). The single key information comprises XPath of the search target metadata fragment as location information of the search target metadata fragment, and XPath of the single key as location information of the single key within the metadata fragment.

XPath of the metadata fragment:
/TVAMain/ProgramDescription/ProgramLocationTable/BroadcastEvent,
XPath of the Service Id: @ServiceId,
Value of key of the Service Id: 507<=ServiceId<=514.

Subsequently, the single key corresponding to the XPath 11a of the fragment and the XPath 12a of the Service Id is retrieved from a key index list (key_index_list) section 10a, and identification information on a key index (key_index) section 20a is extracted. On this basis, representative key values of '509' 13a and '519' 13a, i.e., representative key values which indicate ranges (500-509, 510-519) of values of the key in which values of the key (507-514) to be searched are included, are retrieved from the key index (key_index) section 20a having the extracted identification information. Then, identification information on sub key index (sub_key_index) section 30a for segments 14a having the respective ranges of values of the key (500-509, 510-519) related to the representative key values '509' and '519' is extracted. The identification information of the metadata fragments (i.e., the container identifier information (container_id) and the fragment data identifier information (handle_value) stored in a 'target_container' segment and a 'target_handle' segment, respectively) corresponding to the values of key of 507-514 is extracted from the sub key index (sub_key_index) section 30a, and the relevant metadata fragments are extracted by using the extracted identification information (S12, S14).

For searching the Published Time as an example, the single key information, i.e., XPath information of the search target metadata fragment and XPath information of the single key, and the value of the single key are expressed as follows.

XPath of the fragment:
/TVAMain/ProgramDescription/ProgramLocationTable/BroadcastEvent,
XPath of the Published Time: EventDescription/PublishedTime,
Value of the key of the Published Time: 09:30<=EventDescription/PublishedTime<=10:00.

Metadata fragments corresponding to the values of key of 09:30-10:00 are extracted through the substantially same steps as in the Service Id search (S13, S15). The intersection between the extracted metadata fragments for the Service Id and the Published Time is performed, and metadata of common metadata fragments are provided to the grid guide screen shown in FIG. 2 as a final result (S16).

(2) Second Search Method Using the Single Key Index

In the second method, the fragments are searched by use of only one (for example, Service Id) of the two single keys related to the search conditions as illustrated in FIG. 8b (S21-S23), and only the fragments of which the Published Time as another search condition, that is, between 09:30 and 10:00, are selected from the searched fragments (S24).

Since intermediate resultant fragments obtained through the search using the respective single keys is usually very large in number, these search methods using the single key index structure are not efficient. In the first method, since all programs in the range of the relevant Service Id are obtained as a search result independently of the range of the Published Time, and programs in the relevant time range for all the Service Ids are obtained as and search result, the size of the search result may become very large. Moreover, since the calculation is also complicated in the process of combining the two intermediate search results large in size, overhead in the receiving apparatus is considerably increased. In the second method, one intermediate result should be additionally filtered by the other search condition. Consequently, the compound condition search using the single key index structure may cause heavy overhead in the receiving apparatus. Additionally, when a search condition for a single key is input, location information on a field of the search condition in the metadata is determined and the determined location information is compared to key information in the key index list so as to search the corresponding key. In such a case, an overhead is caused since comparison of both XPaths is necessary.

SUMMARY OF THE INVENTION

Accordingly, an aspect of the present invention is to provide a multi-key index structure of metadata useful for a compound condition search for information on contents.

Another aspect of the present invention is to provide a method of providing indices of the metadata useful for the compound condition of information on the contents, a method of searching for the metadata using the indices of the metadata, and a searching apparatus using the same. Still another aspect of the present invention is to provide a multi-key index structure where at least a part of the key information, that is, location information defining the keys, is expressed as a predetermined code. Additional aspects and/or advantages of the present invention will be set forth in part in the description which follows and, in part, will be obvious from the description, or may be learned by practice of the invention.

To achieve the above and/or other aspects of the present invention, there is provided an index structure for metadata divided into fragments, comprising a list of multi-keys which correspond to a combination of fields of the metadata, and location information for defining a multi-key of the list. The index structure may further comprise values of the multi-key and identification information of the metadata corresponding to the values of the multi-key. The identification information of the metadata may comprise identification information on ones of the fragments of the metadata corresponding to the values of the multi-key.

The index structure may further comprise a sub-section including ranges of values of the multi-key and identification information on ones of the fragments of the metadata corresponding to the values of the multi-key, and a section including representative key values representing the respective ranges of values of the multi-key.

The list may include identification information on the section, and the section may further include identification information on the sub-section. At least a part of the location information may be expressed as a predetermined code. The location information may comprise location information of a fragment including the multi-key and location information of the multi-key within the fragment. In another aspect, the location information may be expressed in XPath.

Each of the representative key values may be a value among the corresponding range of values of the multi-key. The representative key value may be one of a maximum value, a minimum value or an intermediate value among the values within the predetermined range. The metadata may be metadata as defined in the TVA Forum.

To achieve the above and/or other aspects of the present invention, there is provided another index structure for metadata divided into fragments, comprising values of multi-keys, and identification information of the metadata corresponding to the values of the multi-keys, wherein the multi-keys correspond to a combination of fields of the metadata. The index structure may further comprise a list of the multi-keys. The index structure may further comprise location information for defining the multi-keys, wherein at least a part of the location information is expressed as a predetermined code. The identification information of the metadata may comprise identification information of ones of the fragments of the metadata corresponding to the values of the multi-keys.

With respect to comparison of the values of a multi-key in size, the multi-key may comprise fields (k1, k2, k3 ... kn) of the metadata which are prioritized (k1>k2>k3> ... Kn), and the combined fields may be compared in sequence, starting from a first field having a highest order of priority, wherein the values are compared on an arithmetic basis where the values of the multi-key are numerical or ranked in lexicographical order where the values of the multi-key are alphabetical. First and second values of the multi-key may correspond to (a1, a2, a3 ... an) and (b1, b2, b3 ... bn), respectively, and the first and second values (a1, a2, a3 ... an) and (b1, b2, b3 ... bn) of the multi-key may be determined to be of the same size where there is no field having a different size.

To achieve the above and/or other aspects of the present invention, there is provided still another index structure for metadata divided into fragments, comprising a key index list section comprising a list of multi-keys, each multi-key corresponding to a combination of fields of the metadata, a key index section, and a sub-key index section, wherein for a multi-key of the key index list, the sub-key index section comprises ranges of values of the multi-key and identification information on ones of the fragments of the metadata corresponding to the values of the multi-key, and the key index section comprises representative key values representing the respective ranges of values of the multi-key.

The key index list section may further comprise location information for defining the multi-keys, wherein at least a part of the location information is expressed as a predetermined code.

To achieve the above and/or other aspects of the present invention, there is provided a computer readable medium containing a data structure for storing an index for metadata divided into fragments, the index provided to search the metadata.

To achieve the above and/or other aspects of the present invention, there is provided a method of providing an index structure for metadata divided into fragments, the method comprising providing a list of multi-keys corresponding to a combination of fields of the metadata, and location information for defining a multi-key of the list.

The method may further comprise providing values of the multi-key and identification information of the metadata corresponding to the values of the multi-key.

The location information may be expressed in XPath. At least a part of the location information is expressed as a predetermined code. The metadata may be metadata as defined in the TVA Forum.

The method mau further comprise providing a sub-section including ranges of values of the multi-key and identification information on ones of the fragments of the metadata corresponding to the values of the multi-key, and providing a section including representative key values representing the respective ranges of values of the multi-key.

Each of the representative key values is a value among the corresponding range of values of the multi-key. The representative key value may be one of a maximum value, a minimum value or an intermediate value among the values within the predetermined range.

To achieve the above and/or other aspects of the present invention, there is provided another method of providing an index structure for metadata divided into fragments, the method comprising providing values of multi-keys, and providing identification information of the metadata corresponding to the values of the multi-keys, wherein the multi-keys correspond to a combination of fields of the metadata.

The method may further comprise a list of the multi-keys.

The method may further comprise providing location information for defining the multi-keys, wherein at least a part of the location information is expressed as a predetermined code.

The identification information of the metadata may comprise identification information of ones of the fragments of the metadata corresponding to the values of the multi-keys.

With respect to comparison of the values of a multi-key in size, the multi-key may comprise fields (k1, k2, k3 . . . kn) of the metadata which are prioritized (k1>k2>k3> . . . Kn), and the combined fields may be compared in sequence, starting from a first field having a highest order of priority, wherein the values are compared on an arithmetic basis where the values of the multi-key are numerical or ranked in lexicographical order where the values of the multi-key are alphabetical.

To achieve the above and/or other aspects of the present invention, there is provided still another method of providing an index structure for metadata divided into fragments, the method comprising providing a key index list section comprising a list of multi-keys, each multi-key corresponding to a combination of fields of the metadata, providing a key index section, and providing a sub-key index section, wherein for a multi-key of the key index list, the sub-key index section comprises ranges of values of the multi-key and identification information on ones of the fragments of the metadata corresponding to the values of the multi-key, and the key index section comprises representative key values representing the respective ranges of values of the multi-key.

The key index list section may further comprise location information for defining the multi-keys, wherein at least a part of the location information is expressed as a predetermined code.

To achieve the above and/or other aspects of the present invention, there is provided a method of searching for metadata divided into fragments, using an index having a list of multi-keys and location information for defining the multi-keys, the method comprising searching from the index of the metadata, a multi-key corresponding to search conditions of a combination of fields of the metadata, and extracting a fragment of the metadata using the searched multi-key.

The searching of the multi-key may comprise determining location information corresponding to the fields of the search conditions with respect to the metadata, and searching for the multi-key corresponding to the location information with respect to the fields of the search conditions.

The searching of the multi-key may comprise searching for a value of the multi-key meeting the search conditions.

The searching of the value may comprise searching for the value among values of the multi-key from the index, and the extracting of the fragment may comprise extracting the fragment of the metadata using identification information of the fragment corresponding to the vale of the multi-key.

In response to a plurality of values of the multi-key meeting the search conditions, the extracting of the fragment may comprise extracting ones of the fragments of the metadata corresponding to the values of the multi-key meeting the search conditions.

The searching of the value may comprise searching for a representative key value meeting the search conditions, among representative key values of the index corresponding to ranges of values of the multi-key, and searching for the value among a range of values corresponding to the representative key value.

To achieve the above and/or other aspects of the present invention, there is provided another method of searching for metadata divided into fragments, using an index having a list of multi-keys and location information for defining the multi-keys, the method comprising searching from the index of the metadata, a value of a multi-key corresponding to search conditions of a combination of fields of the metadata, and extracting a fragment of the metadata corresponding to the searched value.

In response to a plurality of values of the multi-key meeting the search conditions, the extracting of the fragment may comprise extracting ones of the fragments of the metadata corresponding to the values of the multi-key meeting the search conditions.

To achieve the above and/or other aspects of the present invention, there is provided still another method of searching for metadata divided into fragments, the method comprising accessing a list comprising a plurality of combinations of location information on a fragment and location information defining at least two key within the fragment, and searching from the list, a combination corresponding to search conditions of at least two key of the metadata.

The method may further comprise extracting one or more fragments of the metadata corresponding to identification information on the metadata identified by the selected combination.

In the method, one of the location information on the fragment and the location information defining the at least two key may be expressed as a predetermined code.

To achieve the above and/or other aspects of the present invention, there is provided an apparatus for searching for metadata divided into fragments, using an index having a list of multi-keys and location information defining the multi-keys, comprising an input unit receiving search conditions, and a control unit searching from the index of the metadata, a multi-key corresponding to the search conditions of a combination of fields of the metadata, and extracting a fragment of the metadata using the searched key.

The control unit may search for a value of the multi-key meeting the search conditions among values of the multi-key from the index, and extract the fragment using identification information of the fragment corresponding to the value of the multi-key.

In response to a plurality of values of the multi-key meeting the search conditions, the control unit may extract ones of the fragments of the metadata corresponding to the values of the multi-key meeting the search conditions.

The control unit may search for a representative value meeting the search conditions, among representative values of the index corresponding to ranges of values of the multi-key, and search for the value among a range of values corresponding to the representative key value.

The location information may be expressed in XPath.

At least a part of the location information may be expressed as a predetermined code.

The metadata may be metadata as defined in the TVA Forum.

To achieve the above and/or other aspects of the present invention, there is provided another apparatus for searching for metadata divided into fragments, using an index having a list of multi-keys and location information defining the multi-keys, comprising an input unit receiving search conditions, and a control unit searching from the index of the metadata, a value of a multi-key corresponding to the search conditions of a combination of fields of the metadata, and extracting a fragment of the metadata using the searched value.

The control unit may search for the value of the multi-key meeting the search conditions among values of the multi-key from the index, and extract the fragment using identification information of the fragment corresponding to the value of the multi-key.

The control unit may search for a representative value meeting the search conditions, among representative values of the index corresponding to ranges of values of the multi-key, and search for the value among a range of values corresponding to the representative key.

In response to a plurality of values of the multi-key meeting the search conditions, the control unit may extract ones of the fragments of the metadata corresponding to the values of the multi-key meeting the search conditions.

At least a part of the location information may expressed as a predetermined code.

The apparatus may further comprise a receiving unit receiving the metadata and the index of the metadata, a storage unit storing therein the metadata and the index of the metadata, and an output unit outputting the search result by the control unit.

To achieve the above and/or other aspects of the present invention, there is provided still another apparatus for searching for metadata divided into fragments, using an index having a list of multi-keys and location information defining the multi-keys, comprising an input unit receiving search conditions of at least two keys of the metadata, and a control unit selecting from a list comprising a plurality of combinations of location information on a fragment and location information defining at least two keys within the fragment, a combination corresponding to the search conditions.

The control unit further may extract one or more fragments of the metadata corresponding to identification information on the metadata identified by the selected combination.

One of the location information on the fragment and the location information defining the at least two key may be expressed as a predetermined code.

BRIEF DESCRIPTION OF THE DRAWINGS

The above and/or other aspects and features of the present invention will become more apparent from the following description of exemplary embodiments given in conjunction with the accompanying drawings, in which:

FIG. 5 is a schematic diagram illustrating a concept of a general container defined by the TV-Anytime Forum;

FIGS. 7a and 7b are block diagrams illustrating an index structure of metadata and a searching process using a conventional single key scheme;

DESCRIPTION OF THE EXEMPLARY EMBODIMENTS

Hereinafter, embodiments of an index structure of metadata provided for searching for information on contents, a method for providing indices of metadata, and a method and an apparatus for searching for the metadata using the indices of metadata will be described in detail with reference to the accompanying drawings.

The embodiments will be described on the basis of TVA metadata in this specification for the sake of description; however, this will not be interpreted or comprehended in limiting the coverage of protection of the present invention.

Figure 9:
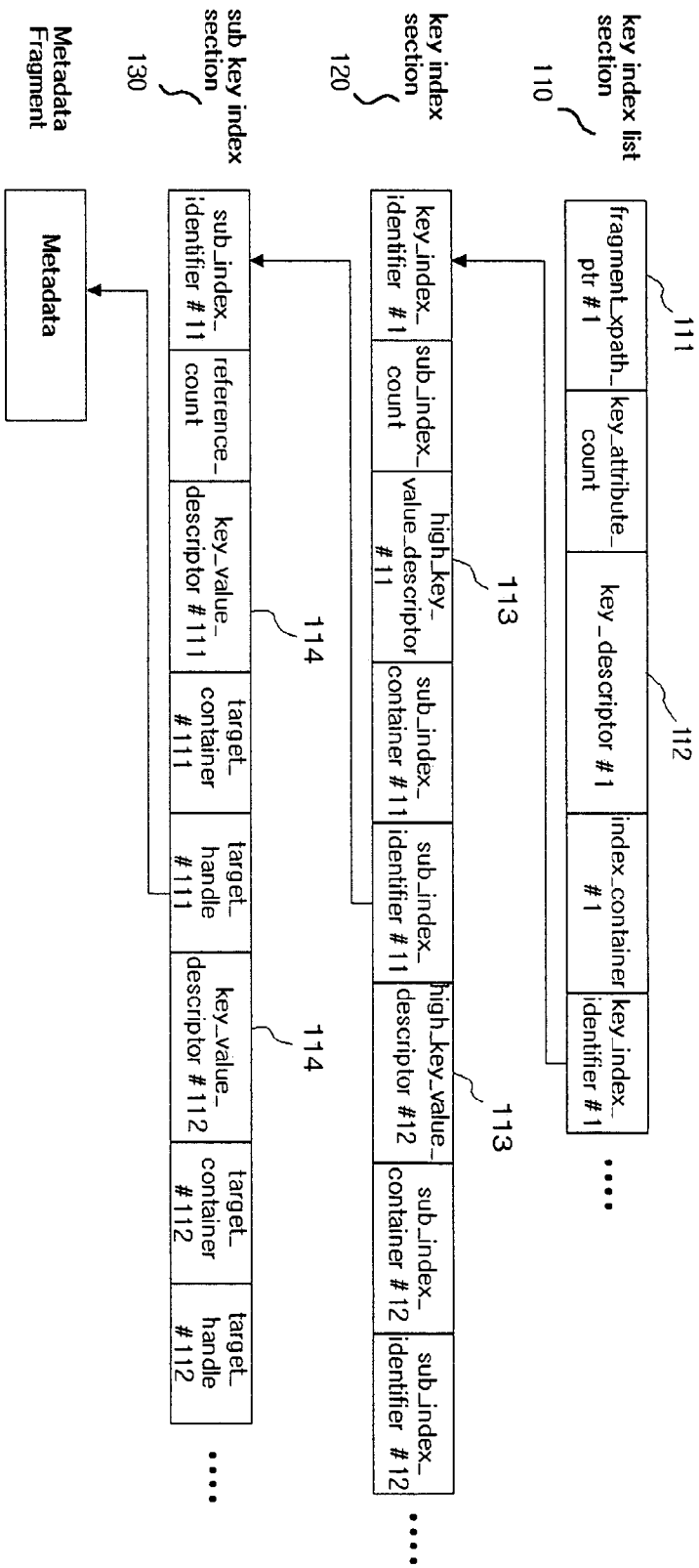
FIG. 9 is a block diagram illustrating an index structure of metadata based on a multi-key scheme according to an embodiment of the present invention.

FIG. 9 shows the syntax defining a multi-key index structure according to an embodiment of the present invention. With reference to FIG. 9, a structure including a key index list (key_index_list) section 110, a key index (key_index) section 120, and a sub key index (sub_key_index) section 130, for indexing TVA metadata fragments transmitted and stored in a data container, as an index structure of the metadata for searching for the information on contents, will be first described, and then the multi-key index structure defined by the syntax will be described.

As compared to the syntax defined in the single key index art reference, the syntax defining an index structure of metadata, that is, the multi-key index structure according to an embodiment of the present invention comprises a structure newly introduced for the multi-key indexing concept including key_descriptor( ), high_key_value_descriptor( ) and key_value_descriptor( ), and structures of key index list (key_index_list) section, key index (key_index) section, and sub key index (sub_key_index) section are reorganized.

1. Key Index List (key_index_list) Section

The key index list (key_index_list) section provides a list of all the transmitted multi-keys. In each key index list (key_index_list) structure, key_descriptor( ) is included so as to enable multi-key indexing, as shown in Table 1.

TABLE 1

| Syntax | No. of Bits(changeable) |
|---|---|
| key_index_list( ) {<br>  for (j=0; j<key_index_count; j++) {<br>    fragment_xpath_ptr<br>    key_descriptor( ) | <br><br>16<br> |

TABLE 1-continued

| Syntax | No. of Bits(changeable) |
|---|---|
|     index_container | 16 |
|     key_index_identifier | 8 |
|   } | |
| } | | key_index_count: specifies the number of all the transmitted multi-keys, i.e., the number of indices for the entire XML document.

fragment_xpath_ptr( ): describes the XPath of a target fragment of metadata to be indexed, i.e., location information of the target fragment of metadata to be indexed. The location information of the fragment may be expressed as a predetermined code. That is, where the fragment is of, for example, frequently used type, there is provided an encoded value expressing the XPath for the fragment with a predetermined code. Since the XPath of the fragment can be simply expressed as an encoded value, the overhead in the search for the metadata can be reduced. For example, encoded values may be '0X01', '0X02', '0X03', and so on, and of 8 bits, 16 bits, and so on, according to applications. The location information on the fragment encoded to '0X07' may indicate, for example, the XPath of the 'broadcast event' (BroadcastEvent) fragment. Where the encode value is of '0XOFF', it may indicate a user-defined fragment, and thus, XPath for the relevant user-defined fragment may be added as additional information.

key_descriptor( ): describes a location of the XPath of the multi-key within the XPath of the target fragment group of the metadata to be indexed, i.e., location information of the multi-key within the metadata fragment, and information of the encoding indicator in each element/attribute constituting the multi-key. Similarly to the above, location information of the multi-key, which is of frequently used type, may be expressed as a predetermined code. The encode value for the frequency used type multikey may have a structure similar to encoding of the fragment. The encoding of the XPath of the fragment and the encoding of the XPath of the multi-key may be used simultaneously or independently.

index_container: identifies the container in which a specified key index (key_index) section exists.

key_index_identifier: identifies the key index (key_index) section within the container specified by index_container. The key index (key_index) section can be identified in a unique manner by combination of index_container and key_index_identifier.

2. Key Descriptor (key_descriptor)

The multi-key is a compound key. With respect to a plurality of keys constituting the multi-key, the key_descriptor describes characteristics of the key such as the XPath of the key. Table 2 below shows the key_descriptor.

TABLE 2

| Syntax | No. of Bits(changeable) |
|---|---|
| key_descriptor( ) { | |
|     key_attribute_count | 8 |
| for (j=0; j<key_attribute_count; j++) { | |
|     key_xpath_ptr | 16 |
|   } | |
| } | | key_attribute_count: specifies the number of keys that constitute a multi-key.

key_xpath_ptr: indicates the path relative to fragment_xpath_ptr of the node (key) used as the multi-key.

3. Key Index (key_index) Section high_key_value_descriptor( ) is Newly Introduced.

In this embodiment, high_key_value_descriptor( ) indicates a value of a representative key representing a range of values of the multi-key within the concerned sub-key index (sub_key_index) section among the sub key index (sub_key_index) sections, the number (sub_index_count) of which is indicated by the key index (key_index) section. The high_key_value_descriptor( ) specifies, for example, the highest value among the values of the multi-key within the concerned sub key index (sub_key_index) section. However, any reference value may be employed as far as it represents the values of the multi-key within a predetermined range of values within the concerned sub key index (sub_key_index) section including the minimum value or the intermediate value, etc., as another embodiment of the present invention.

TABLE 3

| Syntax | No. of Bits (changeable) |
|---|---|
| key_index( ) { | |
|   key_index_identifier | 8 |
|   sub_index_count | 8 |
|   for (j=0; j<sub_index_count; j++) { | |
|     high_key_value_descriptor( ) | 16* key_attribute_count |
|     sub_index_container | 16 |
|     sub_index_identifier | 8 |
|   } | |
| } | | key_index_identifier: identifies the key index (key_index) section within the container specified by index_container. The key index (key_index) section can be identified in a unique manner by combination of index_container and key_index_identifier. This is defined in the key index list (key_index_list) section.

sub_index_container: identifies the container in which the designated sub key index (sub_key_index) exists.

sub_index_identifier: identifies the sub key index (sub_key_index) section within the container specified by sub_index_container. The sub key index (sub_key_index) section can be identified in a unique manner by combination of sub_index_container and sub_index_identifier.

Table 4 below represents high_key_value_descriptor( ).

TABLE 4

| Syntax | No. of Bits (changeable) |
|---|---|
| high_key_value_descriptor( ) { | |
| for (j=0; j<key_attribute_count; j++) { | |
|   key_attribute_value | 16 |
| } | |
| } | | key_attribute_count: specifies the number of keys constituting a multi-key. It is defined in the key index list (key_index_list) section.

key_attribute_value: represents a representative key value for each key. The value encoding format is equal to the key_value of the single key indexing scheme.

If high_key_value_descriptor( ) has a value of a multi-key, comparison of the values of the multi-key in size is performed as follows. Where the values of the multi-key are numerical, they are compared on an arithmetic basis; where values of the multi-key are alphabetical, they are ranked in lexicographical order. With respect to a multi-key (k1, k2, ..., kn) which consists of keys k1, k2, ..., kn, it is assumed that k1 has the highest order of priority and kn has the lowest order of priority. Under this assumption, considering two values of the multi-key (a1, a2, ..., an) and (b1, b2, ..., bn), the value of the multi-key (a1, a2, ..., an) is larger than the value of the multi-key (b1, b2, ..., bn) if and only if there exists an integer i ($0 \leq i \leq n-1$) such that for every j($0 \leq j \leq i-1$), aj=bj and ai>bi.

the value of the multi-key (a1, a2, ..., an) is smaller than the value of the multi-key (b1, b2, ..., bn) if and only if there exists an integer i ($0 \leq i \leq n-1$) such that for every j($0 \leq j \leq i-1$), aj=bj and ai<bi.

the value of the multi-key (a1, a2, ..., an) is equal to the value of the multi-key (b1, b2, ..., bn) if and only if for every i($1 \leq i \leq n$), ai=bi.

4. Sub Key Index (sub_key_index) Section key_value_descriptor( ) is newly introduced for the multi-key indexing scheme. The key_value_descriptor( ) represents a value of a multi-key of a target fragment indicated thereby.

TABLE 5

| Syntax | No. of Bits (changeable) |
|---|---|
| sub_key_index( ) { | |
| sub_index_identifier | 8 |
| reference_count | 8 |
| for (j=0; j<reference_count; j++) { | |
| key_value_descriptor( ) | 16* |
| | key_attribute_count |
| target_container | 16 |
| target_handle | 16 |
| } | |
| } | | sub_index_identifier: identifies the sub key index (sub_key_index) section within the container identified by sub_index_container. The sub key index (sub_key_index) section can be identified in a unique manner by combination of sub_index_container and sub_index_identifier. It is defined in the key index (key_index) section.

reference_count: specifies the number of values of the multi-key included in sub_key_index( ).

target_container: identifies the container in which the designated metadata fragment exists.

target_handle: identifies the metadata fragment section within the container identified by target_container. The metadata fragment section can be identified in a unique manner by combination of target_container and target_handle.

Table 6 below shows key_value_descriptor( ).

TABLE 6

| Syntax | No. of Bits (changeable) |
|---|---|
| key_value_descriptor( ) { | |
| for (j=0; j<key_attribute_count; j++) { | |
| key_attribute_value | 16 |
| } | |
| } | | key_attribute_count: specifies the number of keys constituting a multi-key. It is defined in the key index list section.

key_attribute_value: represents a value of each key. The format is equal to key_value in the single key index art reference.

The comparison between key_value_descriptor( ) values is the same as the comparison between high_key_value_descriptor( ) values in the key index (key_index) section structure.

Hereinafter, a multi-key index structure of metadata defined by the syntax described above will be discussed with reference to FIG. 9, which is illustrated by use of segments on the index information.

The key index list (key_index_list) section 110 defined in the index structure provides a list of all the multi-keys transmitted. The list includes multi-key information defining each multi-key and identification information on the key index (key_index) section 120 to be described later. The multi-key information comprises (1) location information of the metadata fragment relevant to the multi-key (expressed, in the TVA, in XPath (fragment_xpath_ptr) for the metadata fragment relevant to the multi-key), and (2) location information of the multi-key within the metadata fragment (expressed, in the TVA, in XPath (key_descriptor) for the nodes used as the multi-keys, that is, a relevant path in the XPath location of the metadata fragment relevant to the nodes used as multi-keys). Like the single index structure, the XPath of the metadata fragment refers to a path for the root node of the TVA metadata XML document, i.e., an absolute path, and the XPath of the node used as the multi-key, i.e., the XPath of the multi-key, refers to a relative path of the multi-key for the metadata fragment. The XPath for the metadata fragment and the XPath for the multi-key are stored in a 'fragment_xpath_ptr' segment 111 and a 'key_descriptor' segment 112, respectively.

The key index list (key_index_list) section 110 also comprises the identification information on the key index (key_index) section 120 of each multi-key to be described later (i.e., the container identifier information (container_id) of the container in which the key index (key_index) section 120 is stored and the key index identifier information). The container identifier information and the key index identifier information are respectively stored in an 'index_container' segment and a 'key_index_identifier' segment in the key index list (key_index_list) section 110 and then transmitted.

The key index (key_index) section 120 defined in the multi-key index data stream structure provides a list of information on the ranges of the values of the multi-key included in the respective sub key index (sub_key_index) section 130, i.e., a representative key value representing a predetermined range of values of the multi-key included in each sub key index (sub_key_index) section 130 (in this embodiment, the highest value of the multi-key), and identification information for the sub key index (sub_key_index) section 130 related to each representative key value (i.e., the container identifier information (container_id) of the container storing therein the sub key index (sub_key_index) section and the sub key index identifier information). The method of comparing the values of the multi-key in this embodiment is identical to that of comparing values of the multi-key described in connection with Table 4.

The key index section (key_index) 120 includes a 'key_index_identifier' segment storing therein the key index identifier information defined in the key index list (key_index_list) section 110, high_key_value_descriptor' segments 113 storing therein the representative key values of the respective ranges of values of the multi-key included in the sub key index (sub_key_index) section 130, and identification information on the sub key index (sub_key_index) section 130 having the values of the multi-key. The identification information on the sub key index (sub_key_index) section 130 includes 'sub_index_container' segments storing therein the container identifier information (container_id) of the containers in which the sub key index (sub_key_index) section 130 is stored, and 'sub_index_identifier' segments storing therein the sub key index identifier information.

The sub key index (sub_key_index) section 130 defined in the index structure provides a list of the values of the multi-key. The list further includes identification information on the metadata fragments corresponding to the values of the multi-key (i.e., container identifier information (container_id) of the container in which the metadata fragment is stored and the identifier information (handle_value) on the metadata fragment).

Accordingly, the sub key index (sub_key_index) section 130 includes a 'sub_index_identifier' segment storing therein the sub key index identifier information defined in the key index (key_index) section 120, 'key_value_descriptor' segments 114 for storing therein the respective ranges of values of the multi-key, and the identification information on the metadata fragments corresponding to the values of the multi-key. The identification information includes 'target_container' segments storing therein the respective container identifier information (container_id) of the containers in which the metadata fragments are stored and 'target_handle' segments storing therein the respective fragment data identifier information (handle_value).

Figure 10:
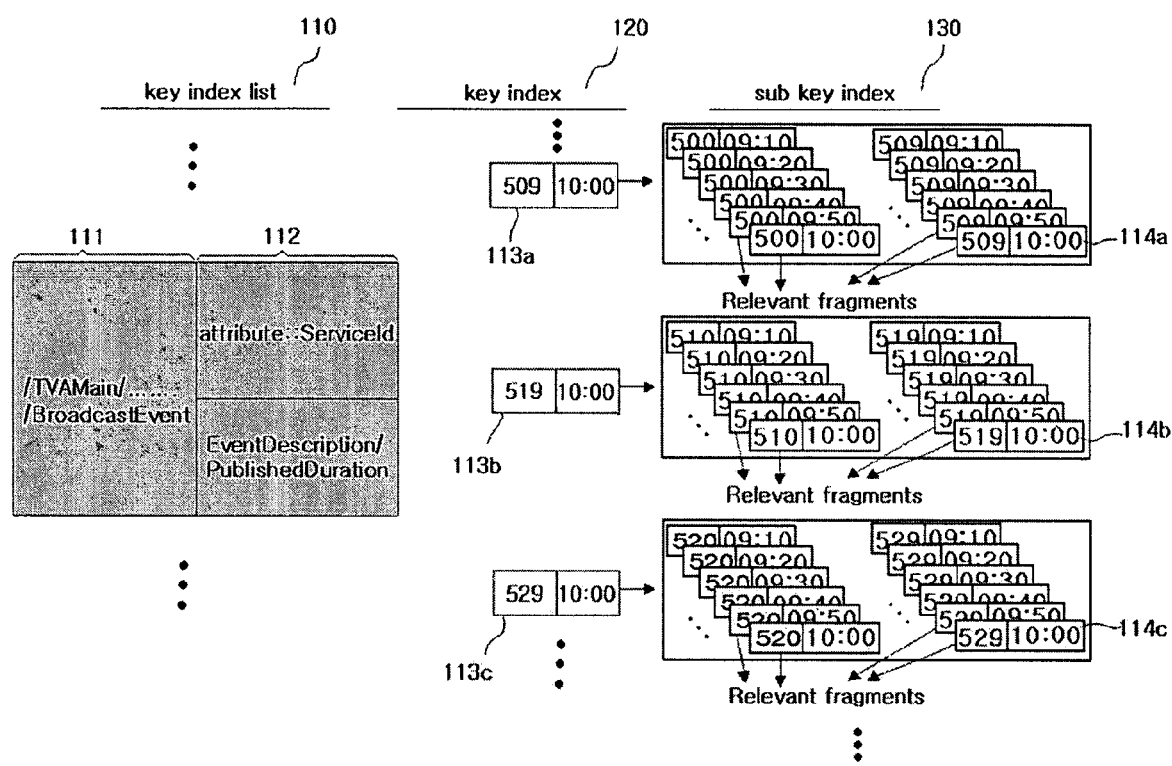
FIG. 10 is a block diagram illustrating an index structure of metadata and a searching process using the multi-key scheme according to an embodiment of the present invention.

The index structure will be more easily understood through FIG. 10, which illustrates the index information.

Figure 1:
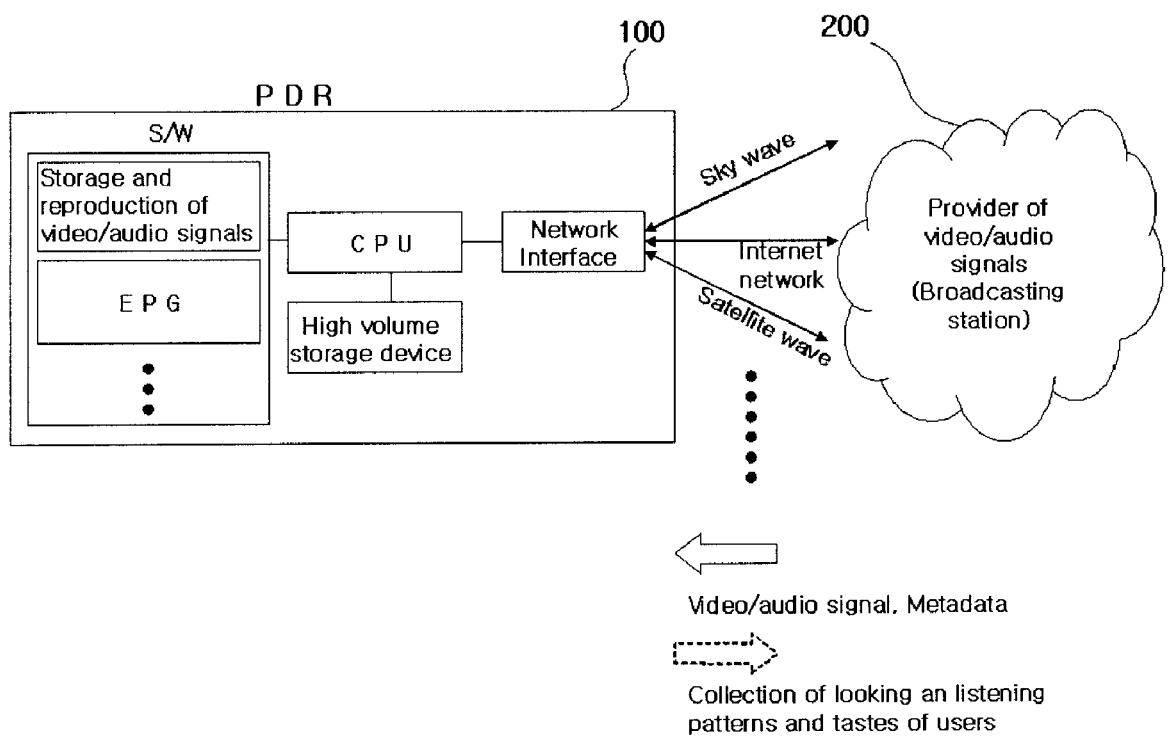
FIG. 1 is a schematic diagram illustrating a concept of a general PDR.
Figure 2:
FIG. 2 shows a grid guide screen in a general EPG application.
Figure 3:
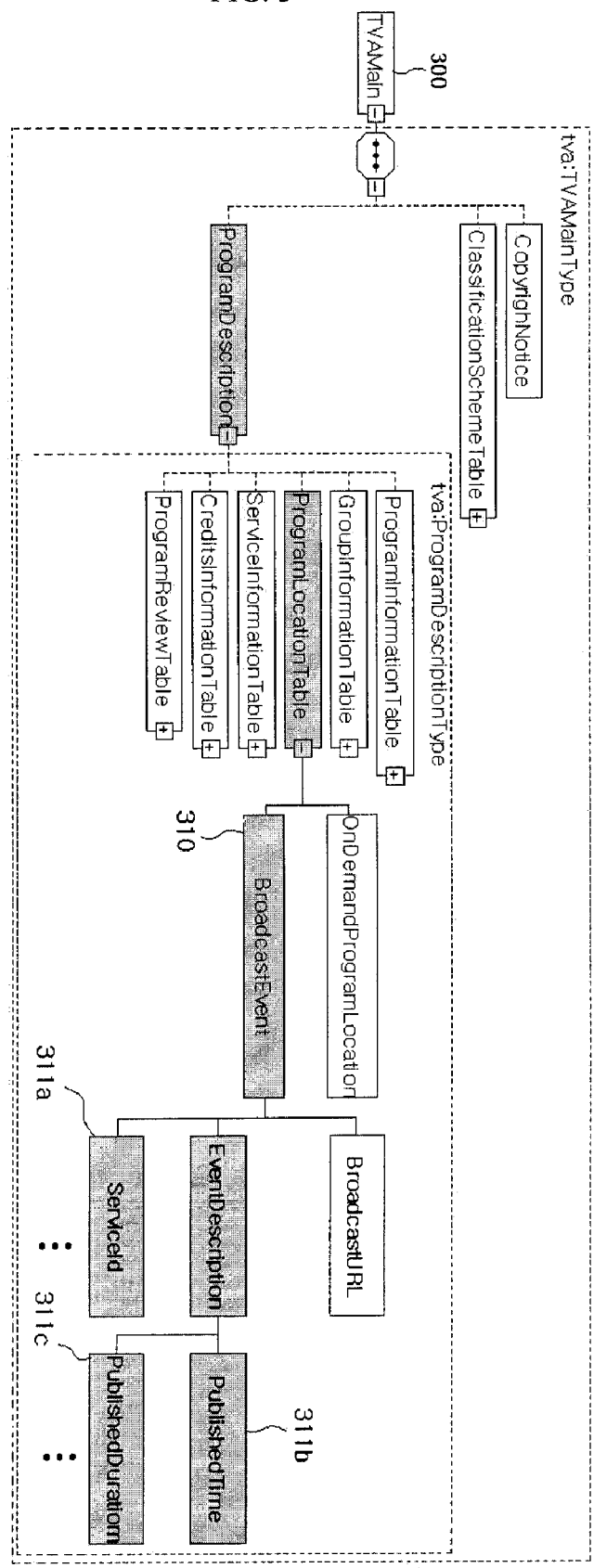
FIG. 3 is a block diagram illustrating a structure of general metadata defined by the TV-Anytime Forum.
Figure 4:
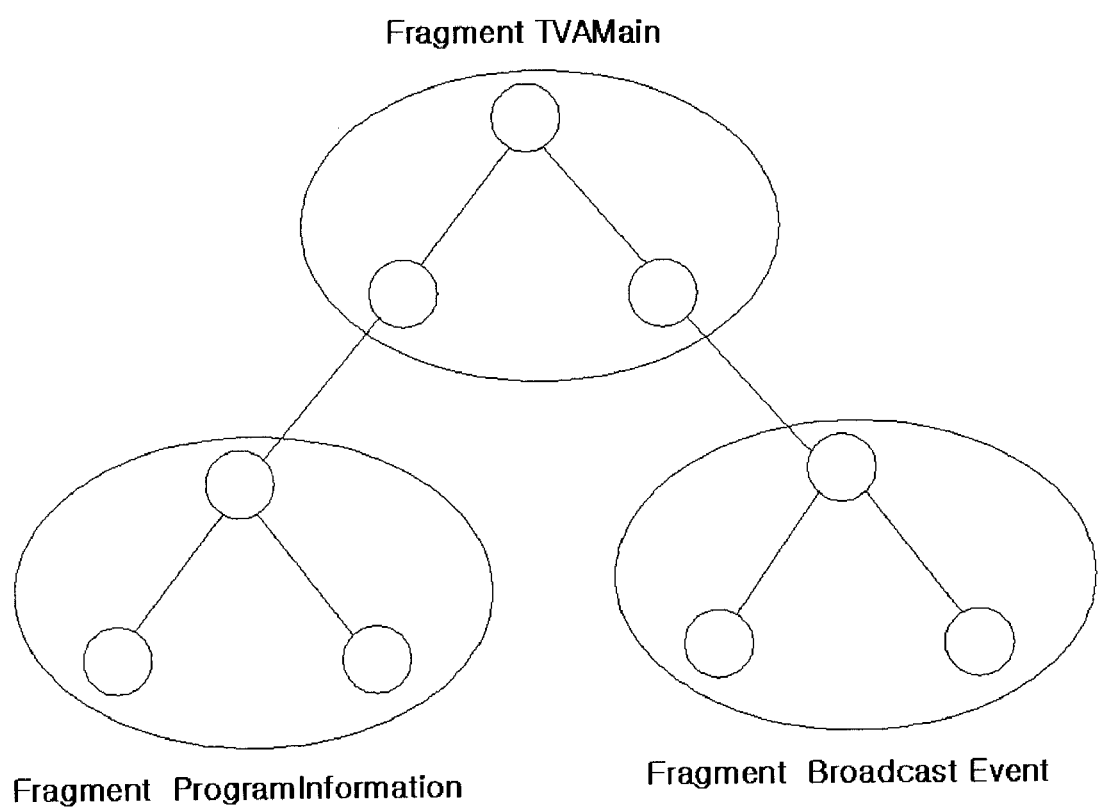
FIG. 4 is a schematic diagram illustrating a concept of a general fragment defined by the TV-Anytime Forum.
Figure 6:
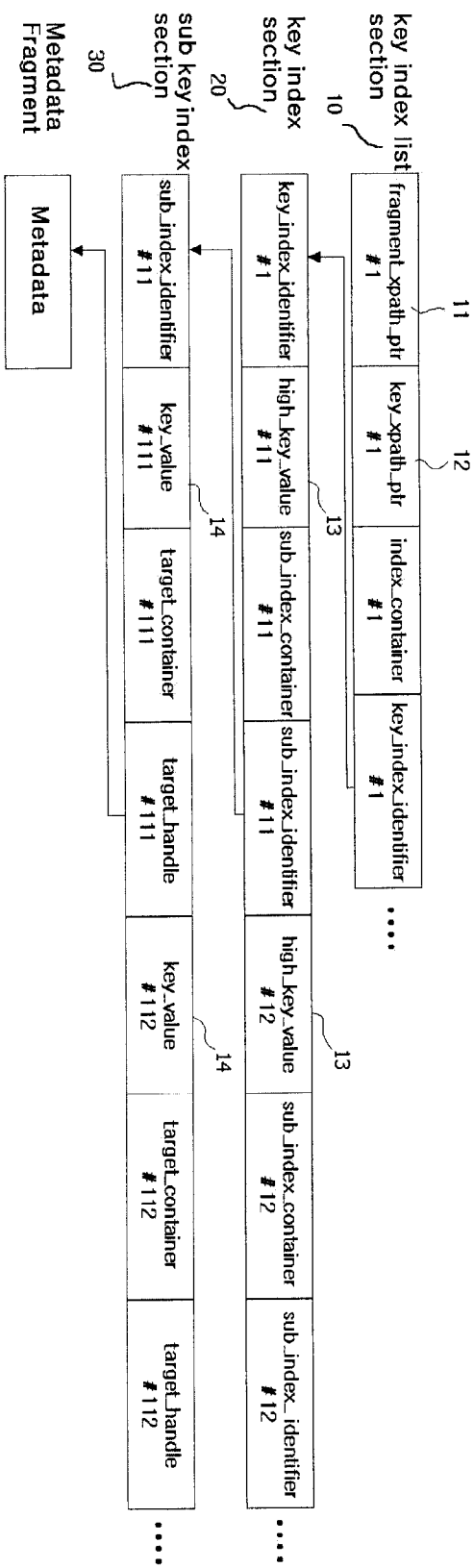
FIG. 6 is a block diagram illustrating an index structure of metadata employing a conventional single key concept.
Figure 7B:
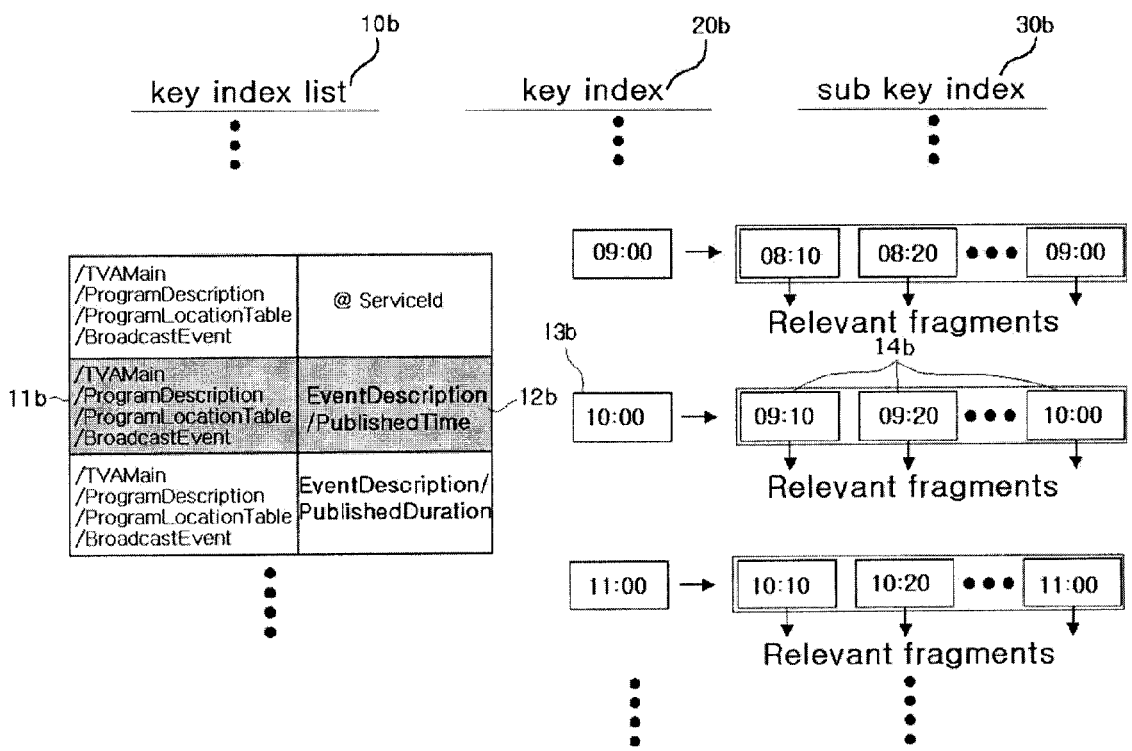
Figure 8A:
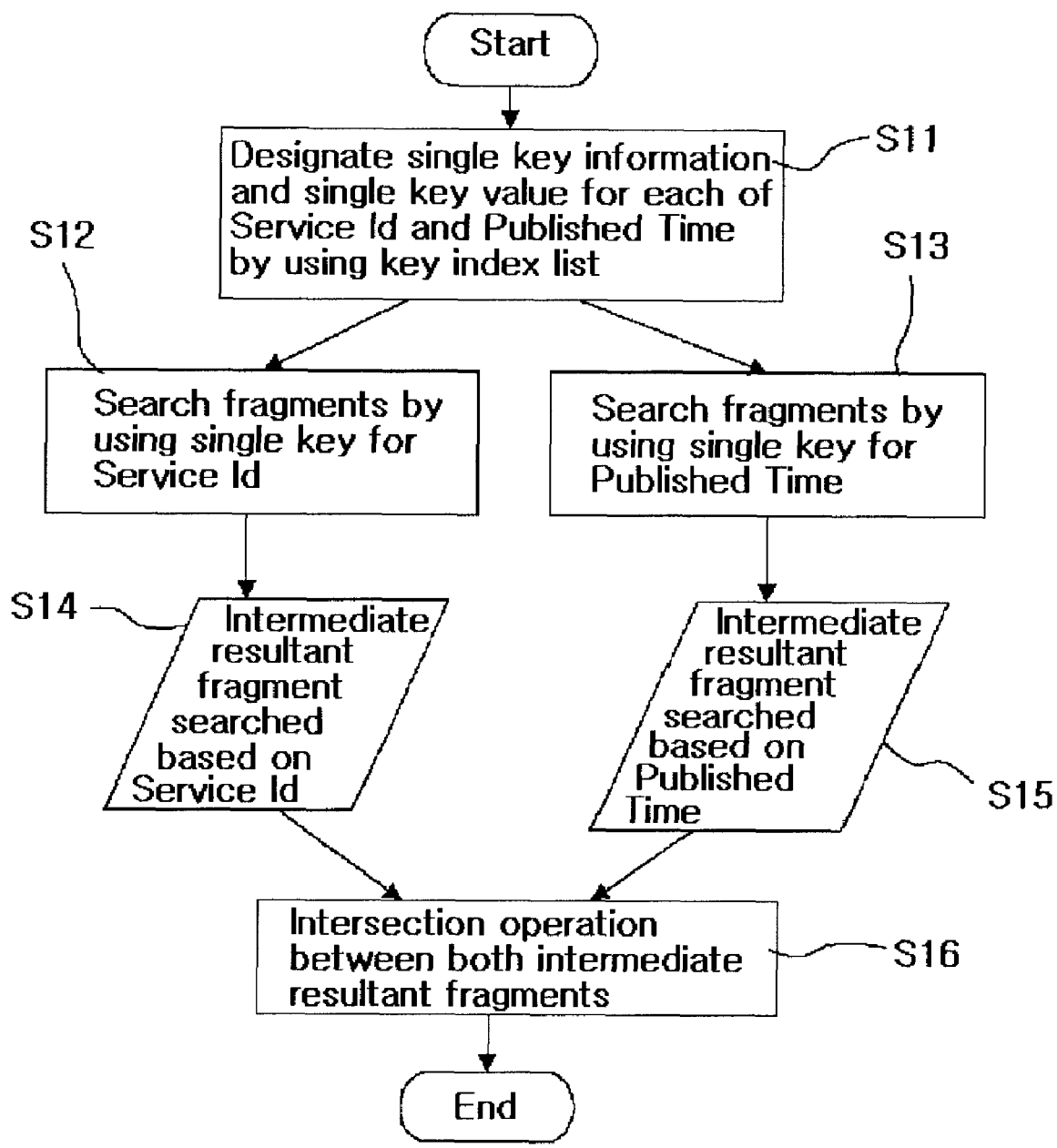
FIGS. 8a and 8b are diagrams illustrating searching methods for metadata using the conventional single key scheme.
Figure 8B:
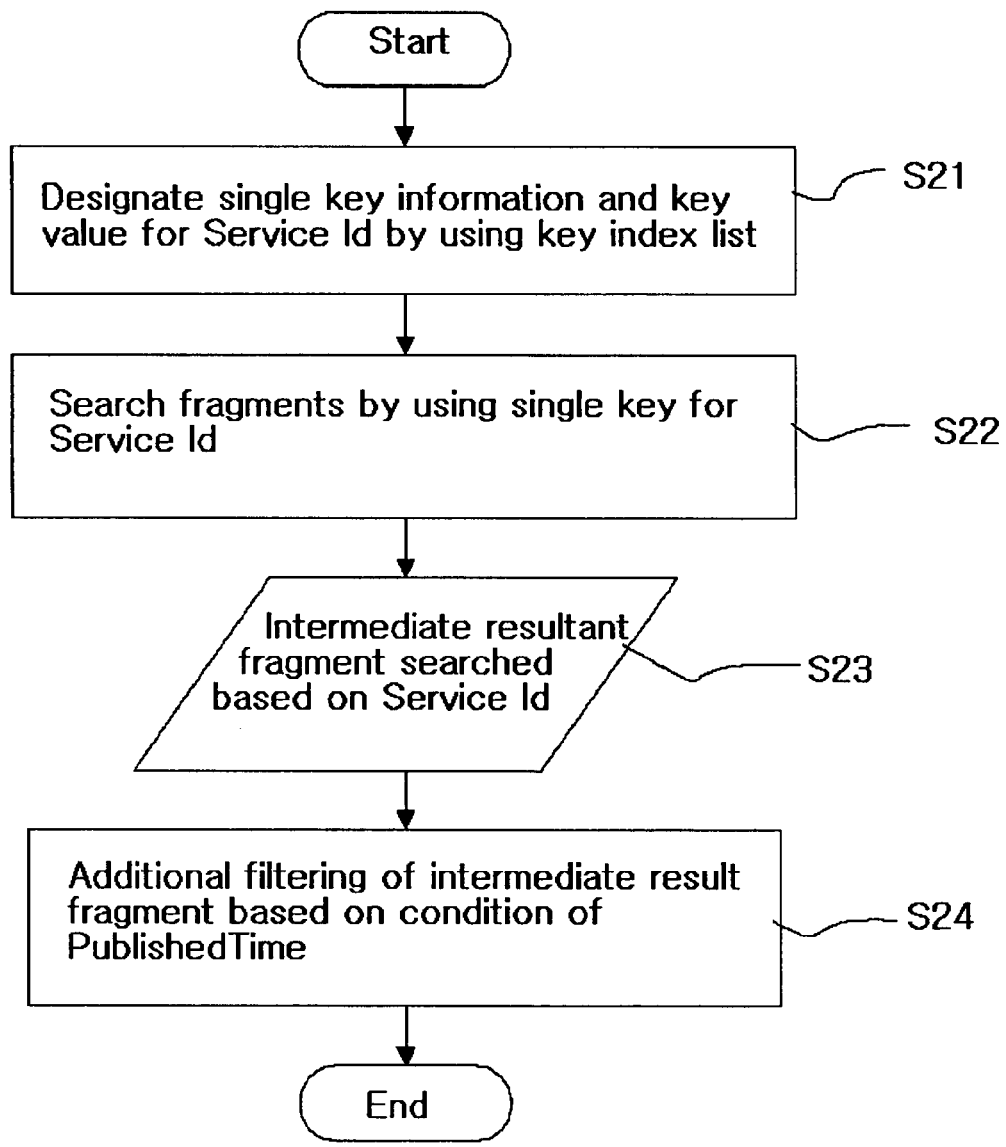

FIG. 10 shows a multi-key index list (key_index_list) section comprising a multi-key for Service Id and Published Time. The upper node of a metadata fragment including the multi-key related to the Service Id and the Published Time is 'BroadcastEvent' 310 as indicated by the shaded region in FIG. 3. Therefore, the XPath of '/TVAMain/ProgramDescription/ProgramLocationTable/BroadcastEvent' for the 'BroadcastEvent' fragment is stored in the 'fragment_xpath ptr' segment 111, and the XPaths of the multi-key of the Service Id and the Published Time for the 'BroadcastEvent' fragment, which are '@ServiceId' 311a, and 'EventDescription/PublishedTime' 311b, are stored in the 'key_descriptor' segment 112.

This index stream structure allows searches for and access to the metadata fragments to be conducted efficiently, when searches are conducted based on more than one conditions, i.e., compound condition searches are conducted.

Although the multi-key for the Service Id and the Published Time is referred to in this present embodiment by way of example, a variety of the multi-keys may also be employed in combination. For example, a multi-key for start and end times of a program in connection with a broadcast schedule, a multi-key for family and given names of a person (actor, director, or the like) involved in the program, and so on.

Where the multi-key for the start and end times of the program in connection with the broadcast schedule is used, an upper node of a metadata fragment including the multi-key for the start and end times of the program may be 'Schedule' (not shown). Therefore, the XPath, '/TVAMain/ProgramDescription/ProgramLocationTable/Schedule,' for the 'Schedule' fragment may be stored in the 'fragment_xpath_ptr' segment 111, and the XPaths, '@start' and '@end', of the multi-key of the start and end times of the program for the 'Schedule' fragment may be stored in the 'key_descriptor' segment 112.

Where the multi-key for family and given names of a person (actor, director, or the like) involved in the program is used, an upper node of a metadata fragment including the multi-key for the family and given names of the person (actor, director, or the like) may be 'PersonName' (not shown), and therefore, the XPath, 'TVAMain/ProgramDescription/CreditsInformation Table/PersonName,' for the 'PersonName' fragment may be stored in the 'fragment_xpath_ptr' segment 111, and the XPaths, 'FamilyName' and 'GivenName', of the multi-key for the family and given names of the person in the program for the 'PersonName' fragment may be stored in the 'key_descriptor' segment 112.

Figure 11:
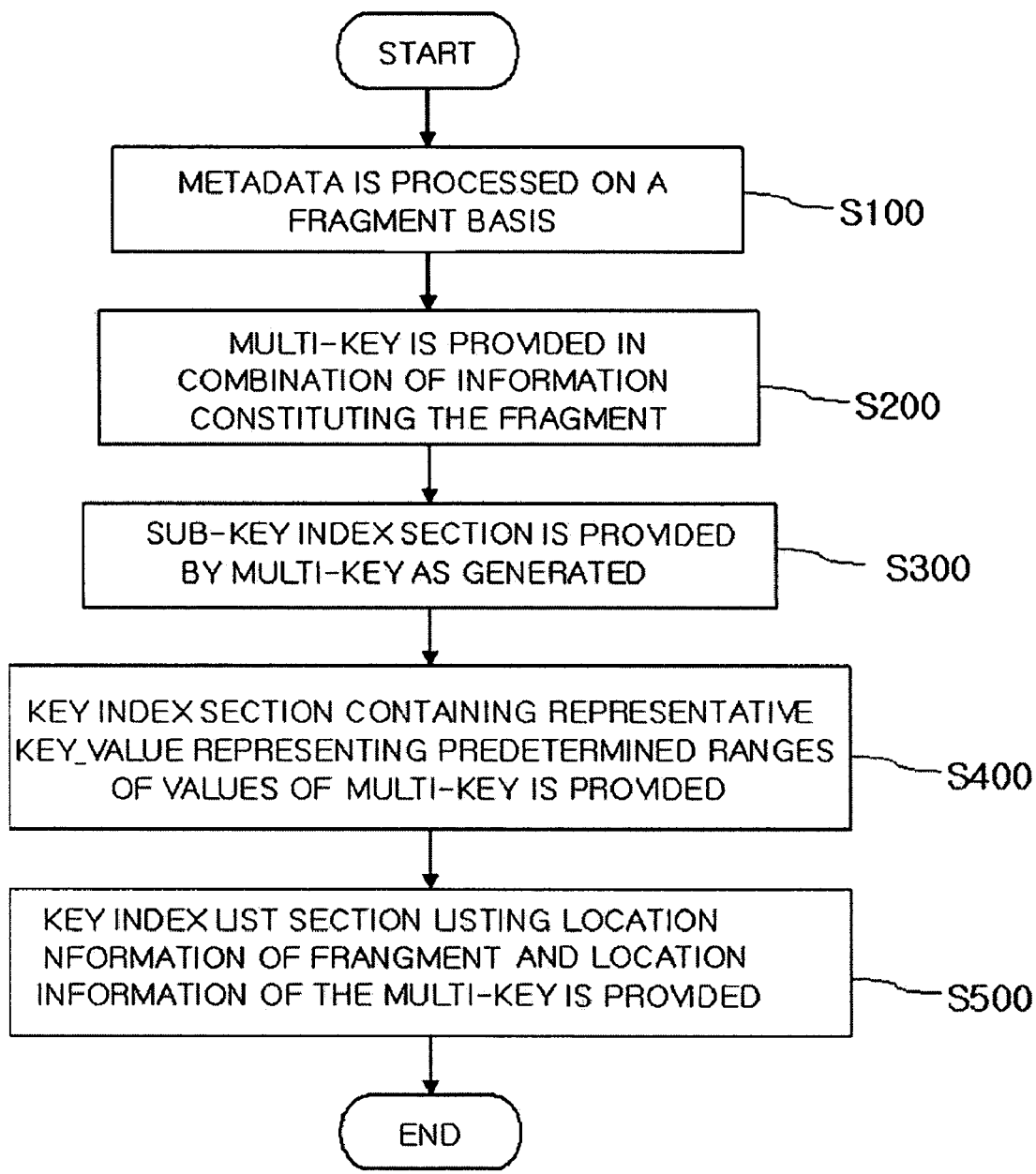
FIG. 11 is a block diagram illustrating a method of providing indices of metadata according to an embodiment of the present invention.

FIG. 11 illustrates a method of providing an index of metadata having a structure according to an embodiment of the present invention. The index of metadata may be generated by a provider 200 providing audio/visual signals.

Information on contents, that is, metadata is processed in a unit of fragment as described above (S100). A multi-key is provided by combination of keys related to information on the fragments, for example, 'Service ID' and 'Published Time' (S200). Then, a sub key index (sub_key_index) section 130 is provided, wherein segments, i.e., 114a, 114b, 114c, etc., having ranges of values of the multi-key are provided as described above (S300). The sub key index (sub_key_index) section 130 further includes metadata fragment identification information corresponding to the values of the multi-key (that is, container identifier information (container_id) and fragment data identifier information (handle_value) respectively stored in the 'target_container' segments and the 'target_handle' segments shown in FIG. 9).

A key index (key_index) section 120 containing therein representative key values representing the ranges of values of the multi-key is provided (S400). For example, with reference to FIG. 9, representative key values '509/10:00' and '519/10:00' (113a and 113b) representing the predetermined ranges 500~509/09:10~10:00 and 510~519/09:10~10:00 (114a and 114b) of the values of the multi-key for the Service ID/Published Time as combined are included therein. In this embodiment, the Service ID has an upper order of priority over the Published Time. The key index (key_index) section 120 further includes identification information on the sub key index (sub_key_index) section 130 storing therein the values of the multi-key(that is, container identifier information (container-id) of the containers in which the sub key index (sub_key_index) section of FIG. 9 is stored, and sub key index identifier information). It is understood that other multi-keys and corresponding key index sections and/or sub-key index sections may be provided as described above.

A key index list (key_index-list) section 110 in which multi-key information, that is, location information of a metadata fragment to which each field constituting the provided multi-key belongs and location information of each field within the metadata fragment is arranged on a multi-key basis, is provided (S500). For example, where keys of the 'Service ID' and the 'Published Time' are in combination, the multi-key information of the combined 'Service ID' and 'Published Time,' such as the XPath of a target metadata fragment for indexing(/TVAMain/ProgramDescription/Program LocationTable/BroadcastEvent) and XPath of a multi-key for the metadata fragment (XPath '@ServiceID' of the Service ID and the XPath 'EventDescription/PublishedTime' of the Published Time) are included in the key index list (key_index_list) section 110.

The above steps may be processed in reverse order in other embodiments of the present invention. Further, a step of providing a key index (key_index) section 120 including representative key values (S400) or a step of providing a key index list (key_index_list) section (S500) may be deleted depending on some embodiments of the present invention.

Hereinafter, a searching method of obtaining metadata meeting more than one search condition by use of the multikey index structure according to an embodiment of the present invention described above will be described with reference to FIG. 12.

Search conditions for a search are inputted by, for example, a user (S1100). A value of a multi-key satisfying the search conditions as inputted is searched from the metadata index (S1200). A concerned metadata fragment is extracted by use of identification information of the metadata fragment corresponding to the value of the multi-key by use of the searched value of the multi-key (S1300). Through these steps, the metadata satisfying the search conditions is extracted. In the search conditions inputted by the user, fields and a value or a range of a field to be searched may be included.

The step of searching for the value of the multi-key (S1200) comprises steps of determining location information of the metadata fragment to which fields of the inputted search conditions belong and location information of the fields within the metadata fragment (S1210), searching for a multi-key consisting of fields having location information identical to the location information determined above, in the key index list (key_index_list) section 110 by use of the determined location information, and searching for the key index (key_index) section 120 relative to the searched multi-key (S1220), searching for a representative key value composed of values of the fields inputted as search conditions in the key index (key_index) section 120, and searching for sub key index (sub_key_index) section 130 including the values of the multi-key in the range indicated by the representative key value searched above (S1230), and searching for the value of the multi-key satisfying the search conditions in the sub key index (sub_key_index) section 130 searched above (S1240).

In the above steps S1220, S1230 and S1300, the steps of searching for the key index (key_index) section 120, sub key index (sub_key_index) section 130, and extracting the metadata fragment are respectively performed by use of identification information of the key index (key_index) section 120, identification information of the sub key index (sub_key_index) section 130 and identification information of the metadata fragment. It is understood that, for example, where a range of a field of metadata is input as part of the search conditions, there may be more than one searched value of the multi-key, and more than one fragment extracted as described hereinbelow.

Figure 12:
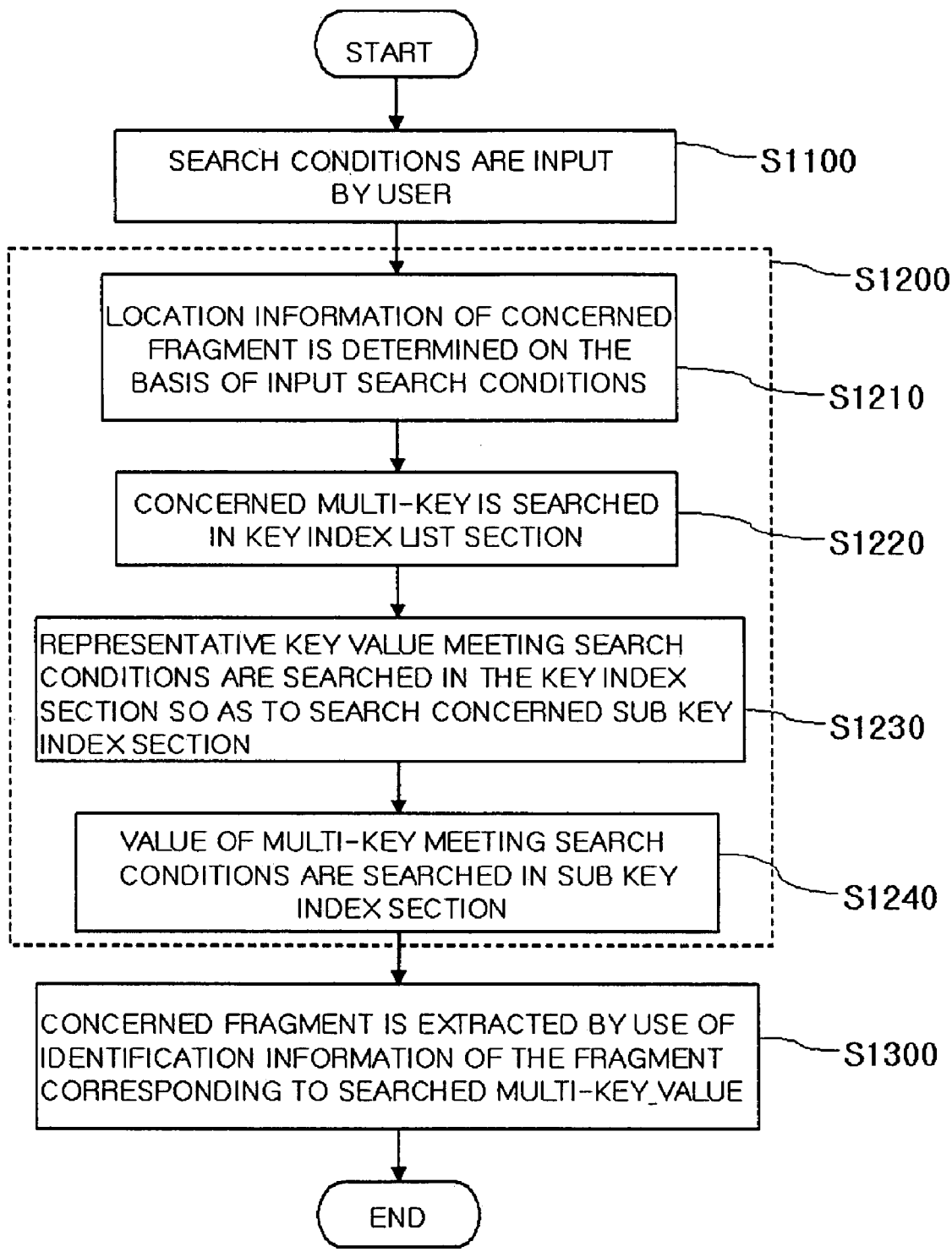
FIG. 12 is a diagram showing a method of searching for the metadata according to an embodiment of the present invention.

The searching method as shown in FIG. 12 may be employed in searching the Service ID and the Published Time described with reference to FIG. 10 in the following manner:

Where a user inputs search conditions of the Service ID in the range of '507~514' and the Published Time in the range of '9:30~10:00' (S1100), location information of concerned metadata fragments is determined from fields in combination of the Service ID in the range of '507~514' and the Published Time in the range of '9:30~10:00' and location information of the fields within the metadata fragments is determined (S1210).

The Service ID and the Published Time inputted as search conditions respectively have '@ServiceId' and 'EventDescription/PublishedTime' as location information within the metadata fragment. On this basis, the location information of the concerned metadata fragment as an attribute of the concerned fragment, that is, the XPath is determined (S1210).

To sum up, we can obtain the following from the above steps:

XPath of the fragment:
/TVAMain/ProgramDescription/ProgramLocationTable/BroadcastEvent XPath of the Service Id: @ServiceId, XPath of the Published Time: EventDescription/PublishedTime Value of of the Service Id: 507<=ServiceId<=514, Value of the Published Time: 9:30<=EventDescription/PublishedTime<=10:00.

Subsequently, a multi-key corresponding to the XPath 111 of the metadata fragment and the XPath 112 of the Service Id/Published Time is searched in the key index list (key_index_list) section 110, and the identification information on the key index (key_index) section 120 including the searched multi-key is extracted (S1220). In the present embodiment, the Service Id is higher in priority than the Published Time. The representative key values of '509/10:00', 113a and '519/10:00', 113b, i.e., the representative key values indicating the ranges (500-509/09:10-10:00, 114a, 510-519/09:10-10:00, 114b) of values of the multi-key to which the values of the multi-key (507-514/09:30-10:00) corresponding to the search conditions belong, are searched from in key index (key_index) section 120 and the identification information on the sub key index (sub_key_index) section 130 having the representative values is extracted from the key index (key_index) section 120 (S1230). Values of the multi-key, having values of keys '507/09:30,' '507/09:40,"... '509/10:00' and '510/09:30, ' '510/09:40'... '514/10:00,' corresponding to the values of the multi-key (507~514/09:30~10:00) corresponding to the search conditions are searched from the sub key index (sub_key_index) section 130, that is, segments 114a and 114b (S1240).

The identification information on the metadata fragments corresponding to the values of the multi-key searched (the container identifier information (container_id) and the fragment data identifier information (handle_value) stored in the 'target_container' segment and the 'target_handle' segment, respectively) is extracted from the sub key index (sub_key_index) section 130 and the relevant metadata fragments are then extracted using the extracted identification information (S1300).

Figure 13:
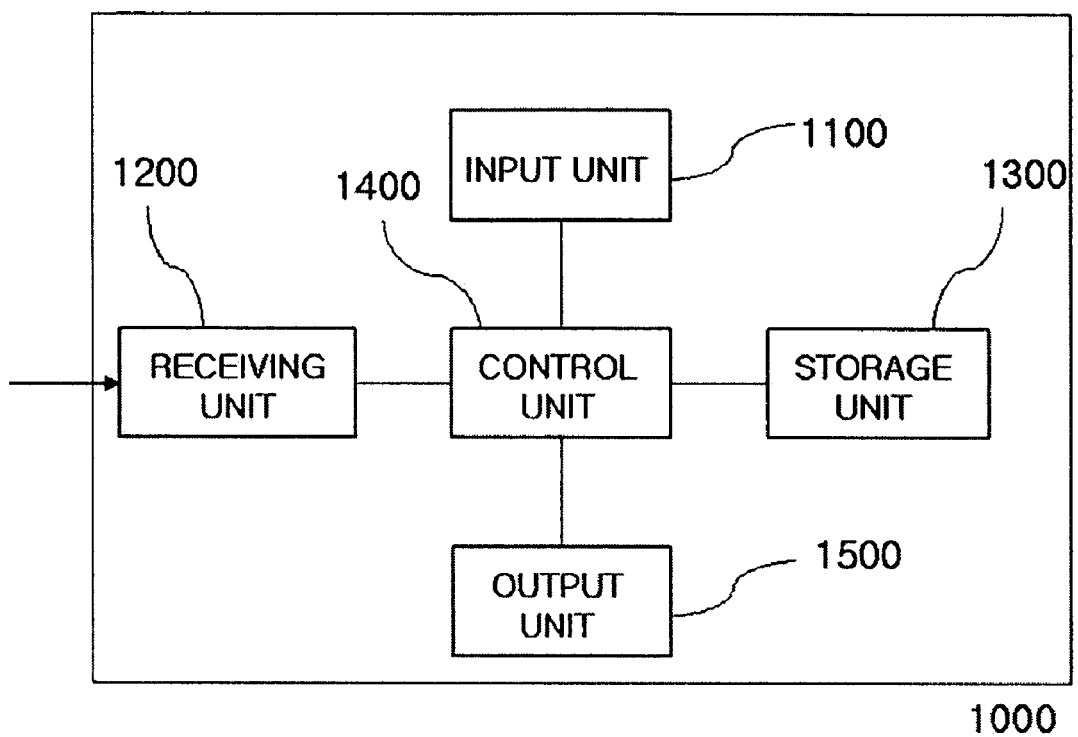
FIG. 13 is a schematic diagram illustrating an apparatus for searching for the metadata according to an embodiment of the present invention.

FIG. 13 shows an apparatus for searching for metadata according to an embodiment of the present invention. The apparatus in the present invention is an apparatus performing a method of searching for the metadata according to an embodiment of the present invention described above with reference to FIG. 12.

The apparatus 1000 comprises an input unit 1100 allowing a user to input search conditions therewith, a receiving unit 1200 receiving contents, metadata on contents or an index of the metadata, a storage unit 1300 storing therein received contents, metadata on the contents or an index of the metadata, a control unit 1400 searching for a value/values of the multi-key corresponding to the input search conditions from the input unit 1100 from the metadata index, and extracting the concerned metadata by use of the value/values of the multi-key as searched, and an output unit 1500 outputting the search result of the control unit 1400.

The control unit 1400 compares the search conditions inputted from the input unit 1100 with the values of the multi-key included in the metadata index stored in the storage unit.

Among the steps of searching for values of the multi-key according to one embodiment of the present invention, a step of searching for a multi-key corresponding to the input search conditions (S1200), or a step of extracting the concerned fragment(s) by use of identification information of the fragment(s) corresponding to the searched multi-key will be understood with reference to the description made above in connection with FIG. 12.

According to the present invention, there is provided an index structure of metadata allowing more efficient search for and access to information on contents, a method of providing the metadata index having the structure, and a method and an apparatus for searching for metadata using the metadata index.

As described above, the present invention enables simultaneous searches by compound conditions for TV Anytime metadata. Where searches by compound conditions for the TV Anytime metadata are conducted, overhead to a searching apparatus is decreased, thereby allowing search time to be shortened and the searching apparatus to be increased in terms of efficiency. However, it is understood that while illustrative, non-limiting embodiments of the present invention overcome the above described disadvantages and other disadvantages not described above, the present invention is not required to overcome the disadvantages described above, and illustrative, non-limiting embodiments of the present invention may not overcome any of the problems described above. It is also understood that a system which uses the present invention also includes permanent or removable storage, such as magnetic and optical discs, RAM, ROM, a carrier wave medium, etc., on which the process and data structures of the present invention can be stored and distributed. The operations can also be distributed via, for example, downloading over a network such as the Internet.

Although the present invention has been described in connection with the exemplary embodiment shown in the drawings, it is only illustrative. It will be understood to those skilled in the art that various modifications and equivalents can be made without departing from the scope and spirit of the invention. Therefore, the scope of the present invention should be defined only by the appended claims.

What is claimed is:

1. A method of searching for metadata divided into fragments and stored in a computer-readable storage medium, using an index having a key index list section having a list of multi-keys and location information for defining the multi-keys, a key index section, and a sub-key index section, the method comprising:

searching for and locating a multi-key in the index, wherein the multi-key meets search conditions of a combination of fields of the metadata; and extracting a fragment of the metadata from the computer-readable storage medium by using the located multi-key, wherein the multi-key is a plurality of keys used simultaneously to locate and extract the fragment of metadata;

wherein with respect to comparison of values of a multi-key in size, the multi-key comprises fields (k1, k2, k3. . . kn) of the metadata which are prioritized (k1>k2>k3>. . . Kn), and the combined fields are compared in sequence, starting from a first field having a highest order of priority, wherein the values are compared on an arithmetic basis where the values of the multi-key are alphabetical, wherein for two multi-key values, (a1, a2, . . . , an) and (b1, b2. . . , bn):

(a1, a2, . . . , an) is larger than (b1, b2, . . . , bn) if and only if there exists an integer i (0<i<n−1) such that for every j (0<i<n−1), aj=bj and ai<bi;

(a1, a2, . . . , an) is smaller than (b1, b2, . . . , bn) if and only if there exists an integer i (0<i<n−1) such that for every j (0<i<n−1), aj=bj and ai <bi; and (a1, a2, . . . , an) is equal to (b1, 2, . . . , bn) if and only if for every i (0<i<n−1), ai=bi.

2. The method as claimed in claim 1, wherein the searching for the multi-key comprises:

determining location information corresponding to the combination of fields of the metadata; and searching for the multi-key corresponding to the determined location information corresponding to the combination of fields of the metadata.

3. The method as claimed in claim 1, wherein the searching of the multi-key comprises searching for a value of the multi-key meeting the search conditions.

4. The method as claimed in claim 3, wherein:

the searching of the value comprises searching for the value among values of the multi-key from the index, and the extracting of the fragment comprises extracting the fragment of the metadata using identification information of the fragment corresponding to the value of the multi-key.

5. The method as claimed in claim 4, wherein in response to a plurality of values of the multi-key meeting the search conditions, the extracting of the fragment comprises extracting ones of the fragments of the metadata corresponding to the values of the multi-key meeting the search conditions.

6. The method as claimed in claim 4, wherein the searching of the value comprises:

searching for a representative key value meeting the search conditions, among representative key values of the index corresponding to ranges of values of the multi-key; and searching for the value among a range of values corresponding to the representative key value.

7. A method of searching for metadata divided into fragments and stored in a computer-readable storage medium, using an index having a key index list section having a list of multi-keys and location information for defining the multi-keys, a key index section, and a sub-key index section, the method comprising:

searching for and locating a value of a multi-key in the index, wherein the key meets search conditions for a combination of fields of the metadata; and extracting a fragment of the metadata from the computer-readable storage medium corresponding to the located multi-key value, wherein the multi-key is a plurality of keys used simultaneously to locate and extract the fragment of metadata;

wherein with respect to comparison of values of a multi-key in size, the multi-key comprises fields (k1, k2, k3, . . . kn) of the metadata which are prioritized (k1<k2<k3<. . . Kn), and the combined fields are compared in sequence, starting from a first field having a highest order of priority, wherein the values are compared on an arithmetic basis where the values of the multi-key are alphabetical, wherein for two multi-key values, (a1, a2, . . . , an) and (b1, b2, . . . , bn): (a1, a2, . . . , an) is larger than (b1, b2, . . . , bn) if and only if there exists an integer i (0<i<n−1) such that for every j (0<j<n−1), aj=bj and ai<bi;

(a1, a2, . . . , an) is smaller than (b1, b2, . . . , bn) if and only if there exists an integer i (0<i<n−1) such that for every j (0<j<n−1), aj=bj and ai<bi; and (a1, a2, . . . , an) is equal to (b1, b2, . . . , bn) if and only if for every i (0<i<n−1), ai=bi.

8. The method as claimed in claim 7, wherein in response to a plurality of values of the multi-key meeting the search conditions, the extracting of the fragment comprises extracting ones of the fragments of the metadata corresponding to the values of the multi-key meeting the search conditions.

9. A computer-readable medium comprising computer-executable instructions for performing the operations recited in claim 1.

10. A computer-readable medium comprising computer-executable instructions for performing the operations recited in claim 7.

11. An apparatus for searching for metadata divided into fragments, using an index having a key index list section having a list of multi-keys and location information defining the multi-keys, a key index section, and a sub-key index section, the apparatus comprising:

a central processing unit (CPU);

an input unit receiving search conditions; and a control unit using the CPU to search the index of the metadata for a multi-key corresponding to the search conditions of a combination of fields of the metadata, and extracting a fragment of the metadata using the searched multi-key, wherein the multi-key is a plurality of keys used simultaneously to locate and extract the fragment of metadata;

wherein with respect to comparison of values of a multi-key in size, the multi-key comprises fields ($k1, k2, k3 \ldots kn$) of the metadata which are prioritized ($k1<k2<k3<\ldots Kn$), and the combined fields are compared in sequence, starting from a first field having a highest order of priority, wherein the values are compared on an arithmetic basis where the values of the multi-key are alphabetical, wherein for two multi-key values, ($a1, a2, \ldots, an$) and ($b1, b2, \ldots, bn$):

($a1, a2, \ldots, an$) is larger than ($b1, b2, \ldots, bn$) if and only if there exists an integer i ($0<i<n-1$) such that for every j ($0<j<n-1$), $aj=bj$ and $ai<bi$;

($a1, a2, \ldots, an$) is smaller than ($b1, b2, \ldots bn$) if and only if there exists an integer i ($0<i<n-1$) such that for every j ($0<j<n-1$), $aj=bj$ and $ai<bi$; and ($a1, a2, \ldots, an$) is equal to ($b1, b2, \ldots, bn$) if and only if for every i ($0<i<n-1$), $ai=bi$.

12. The apparatus as claimed in claim 11, wherein the control unit searches for a value of the multi-key meeting the search conditions among values of the multi-key from the index, and extracts the fragment using identification information of the fragment corresponding to the value of the multi-key.

13. The apparatus as claimed in claim 12, wherein in response to a plurality of values of the multi-key meeting the search conditions, the control unit extracts ones of the fragments of the metadata corresponding to the values of the multi-key meeting the search conditions.

14. The apparatus as claimed in claim 12, wherein the control unit searches for a representative value meeting the search conditions, among representative values of the index corresponding to ranges of values of the multi-key, and searches for the value among a range of values corresponding to the representative key value.

15. The apparatus as claimed in claim 11, wherein the location information is expressed in XPath.

16. The apparatus as claimed in claim 11, wherein at least a part of the location information is expressed as a predetermined code.

17. The apparatus as claimed in claim 11, wherein the metadata is metadata as defined in the TVA Forum.

18. An apparatus for searching for metadata divided into fragments, using an index having a key index list section having a list of multi-keys and location information defining the multi-keys, a key index section, and a sub-key index section, the apparatus comprising:

a central processing unit (CPU);

an input unit receiving search conditions; and a control unit using the CPU to search the index of the metadata for a value of a multi-key corresponding to the search conditions of a combination of fields of the metadata, and extracting a fragment of the metadata using the searched value, wherein the multi-key is a plurality of keys used simultaneously to locate and extract the fragment of metadata;

wherein with respect to comparison of values of a multi-key in size, the multi-key comprises fields ($k1, k2, k3 \ldots kn$) of the metadata which are prioritized ($k1<k2<k3<, \ldots Kn$), and the combined fields are compared in sequence, starting from a first field having a highest order of priority, wherein the values are compared on an arithmetic basis where the values of the multi-key are alphabetical, wherein for two multi-key values, ($a1, a2, \ldots, an$) and ($b1, b2, \ldots, bn$):

($a1, a2, \ldots, an$) is larger than ($b1, b2, \ldots, bn$) if and only if there exists an integer i ($0<i<n-1$) such that for every j ($0<j<n-1$), $aj=bj$ and $ai<bi$;

($a1, a2, \ldots, an$) is smaller than ($b1, b2, \ldots, bn$) if and only if there exists an integer i ($0<i<n-1$) such that for every j ($0<j<n-1$), $aj=bj$ and $ai<bi$; and ($a1, a2, \ldots, an$) is equal to ($b1, b2, \ldots, bn$) if and only if for every i ($0<i<n-1$), $ai=bi$.

19. The apparatus as claimed in claim 18, wherein the control unit searches for the value of the multi-key meeting the search conditions among values of the multi-key from the index, and extracts the fragment using identification information of the fragment corresponding to the value of the multi-key.

20. The apparatus as claimed in claim 19, wherein the control unit searches for a representative value meeting the search conditions, among representative values of the index corresponding to ranges of values of the multi-key, and searches for the value among a range of values corresponding to the representative key.

21. The apparatus as claimed in claim 18, wherein in response to a plurality of values of the multi-key meeting the search conditions, the control unit extracts ones of the fragments of the metadata corresponding to the values of the multi-key meeting the search conditions.

22. The apparatus as claimed in claim 18, wherein at least a part of the location information is expressed as a predetermined code.

23. The apparatus as claimed in claim 18, flirt her comprising:

a receiving unit receiving the metadata and the index of the metadata;

a storage unit storing therein the metadata and the index of the metadata; and an output unit outputting the search result by the control unit.

24. An apparatus for searching for metadata divided into fragments, using an index having a key index list section having a list of multi-keys and location information defining the multi-keys, a key index section, and a sub-key index section, the apparatus comprising:

a central processing unit (CPU);

an input unit receiving search conditions of at least two keys of the metadata; and a control unit using the CPU to select from a list comprising a plurality of combinations of location information of a fragment and location information defining at least two keys within the fragment, a combination corresponding to the search conditions, wherein the multi-key is a plurality of keys used simultaneously to locate and extract the fragment of metadata;

wherein with respect to comparison of values of a multi-key in size, the multi-key comprises fields ($k_1$, $k_2$, $k_3$ ... $k_n$) of the metadata which are prioritized ($k_1 < k_2 < k_3 <, ... K_n$), and the combined fields are compared in sequence, starting from a first field having a highest order of priority, wherein the values are compared on an arithmetic basis where the values of the multi-key are alphabetical, wherein for two multi-key values, ($a_1, a_2, ..., a_n$) and ($b_1, b_2, ..., b_n$):

($a_1, a_2, ..., a_n$) is larger than ($b_1, b_2, ..., b_n$) if and only if there exists an integer i ($0 < i < n-1$) such that for every j ($0 < j < n-1$), $a_j = b_j$ and $a_i < b_i$;

($a_1, a_2, ..., a_n$) is smaller than ($b_1, b_2, ..., b_n$) if and only if there exists an integer i ($0 < i < n-1$) such that for every j ($0 < j < n-1$), $a_j = b_j$ and $a_i < b_i$; and ($a_1, a_2, ..., a_n$) is equal to ($b_1, b_2, ..., b_n$) if and only if for every i ($0 < i < n-1$), $a_i = b_i$.

25. The apparatus as claimed in claim 24, wherein the control unit further extracts one or more fragments of the metadata corresponding to identification information on the metadata identified by the selected combination.

26. The apparatus as claimed in claim 24, wherein one of the location information on the fragment and the location information defining the at least two keys is expressed as a predetermined code.

* * * * *